Figure 5:
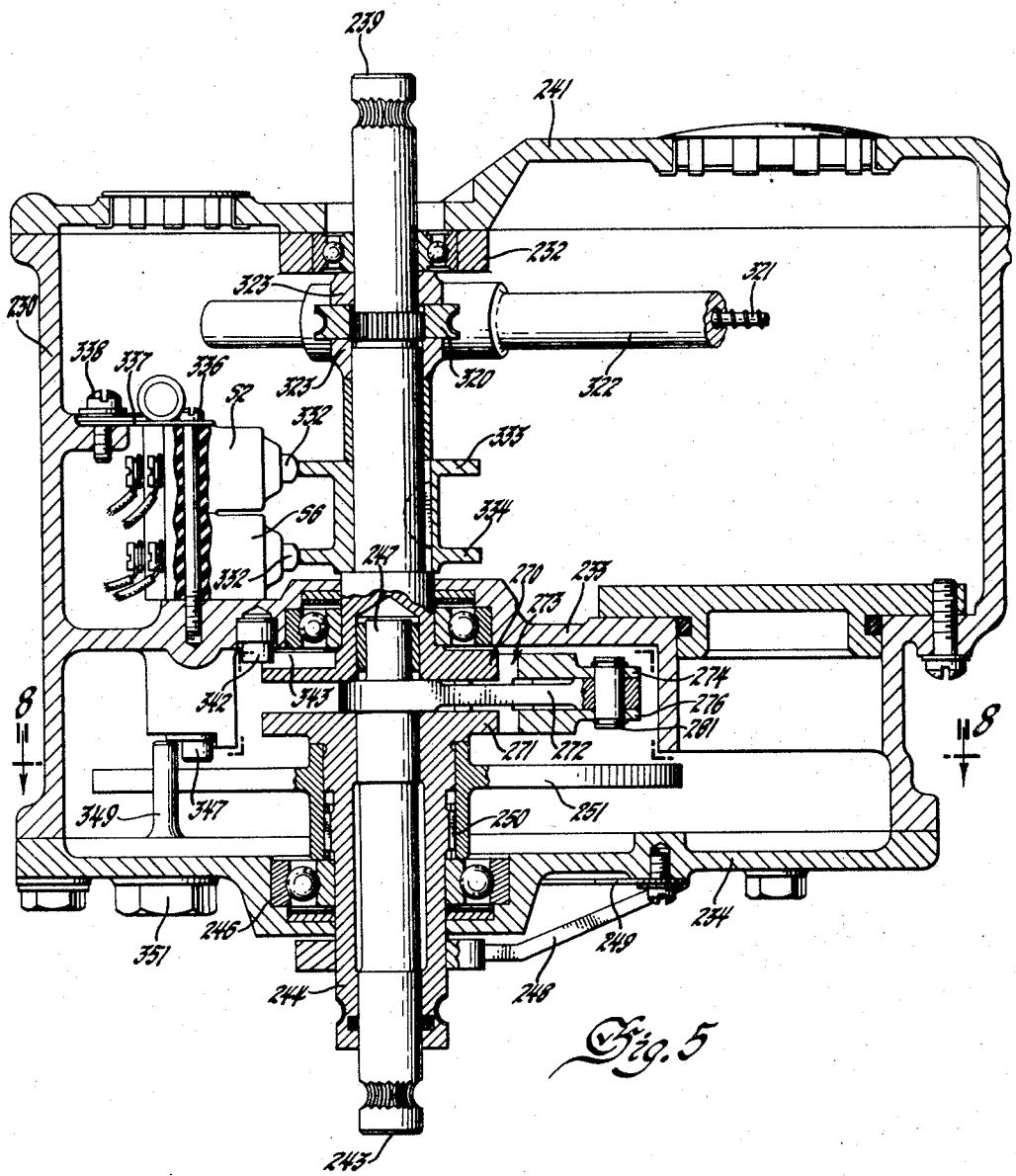

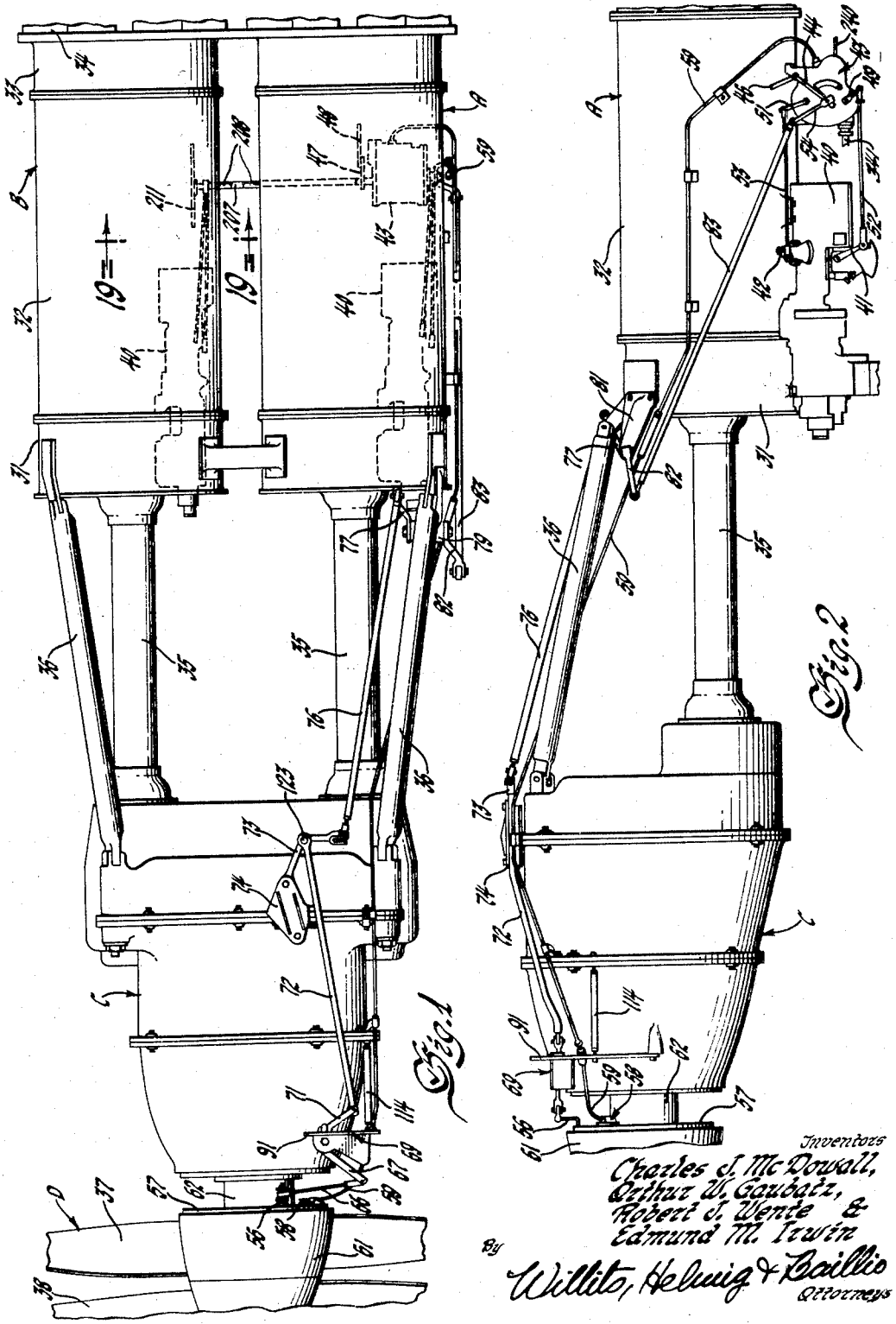

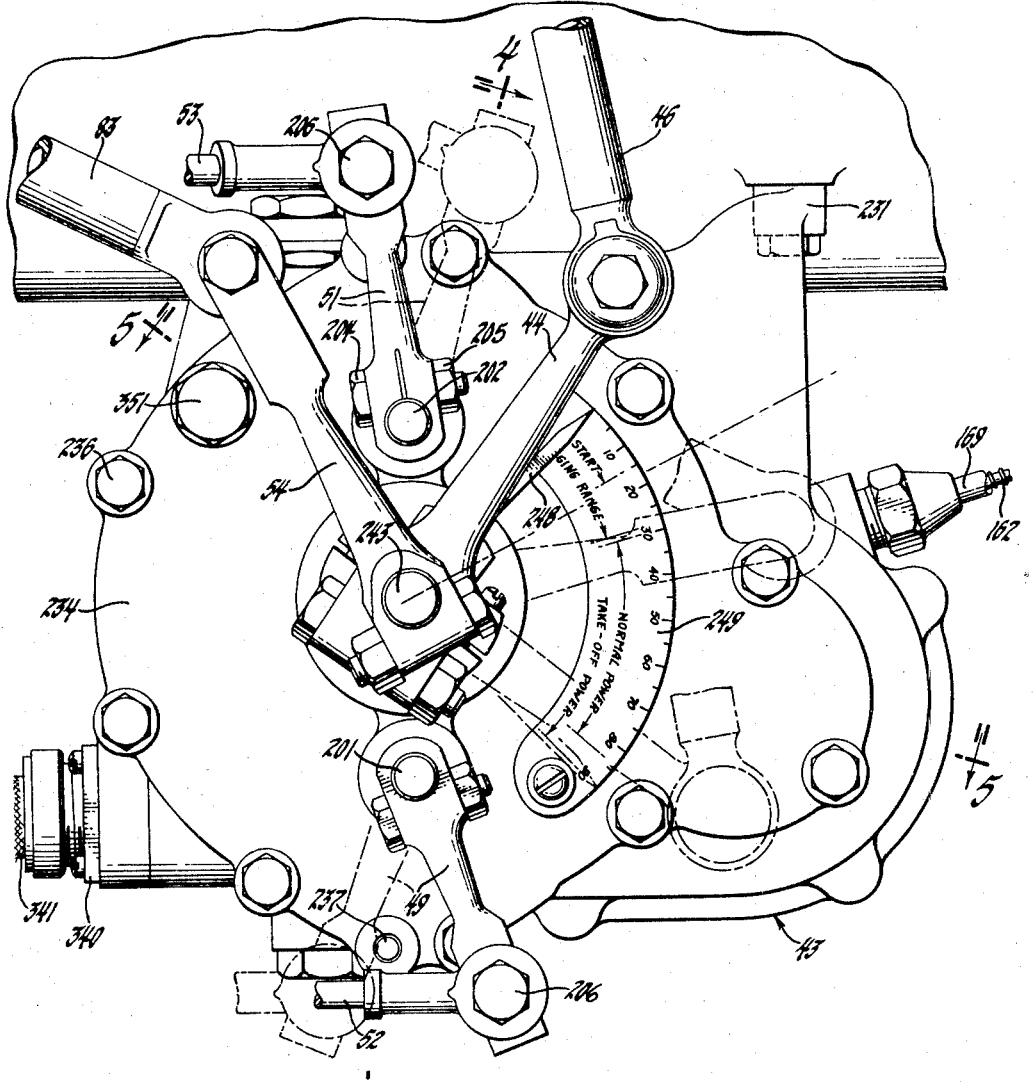

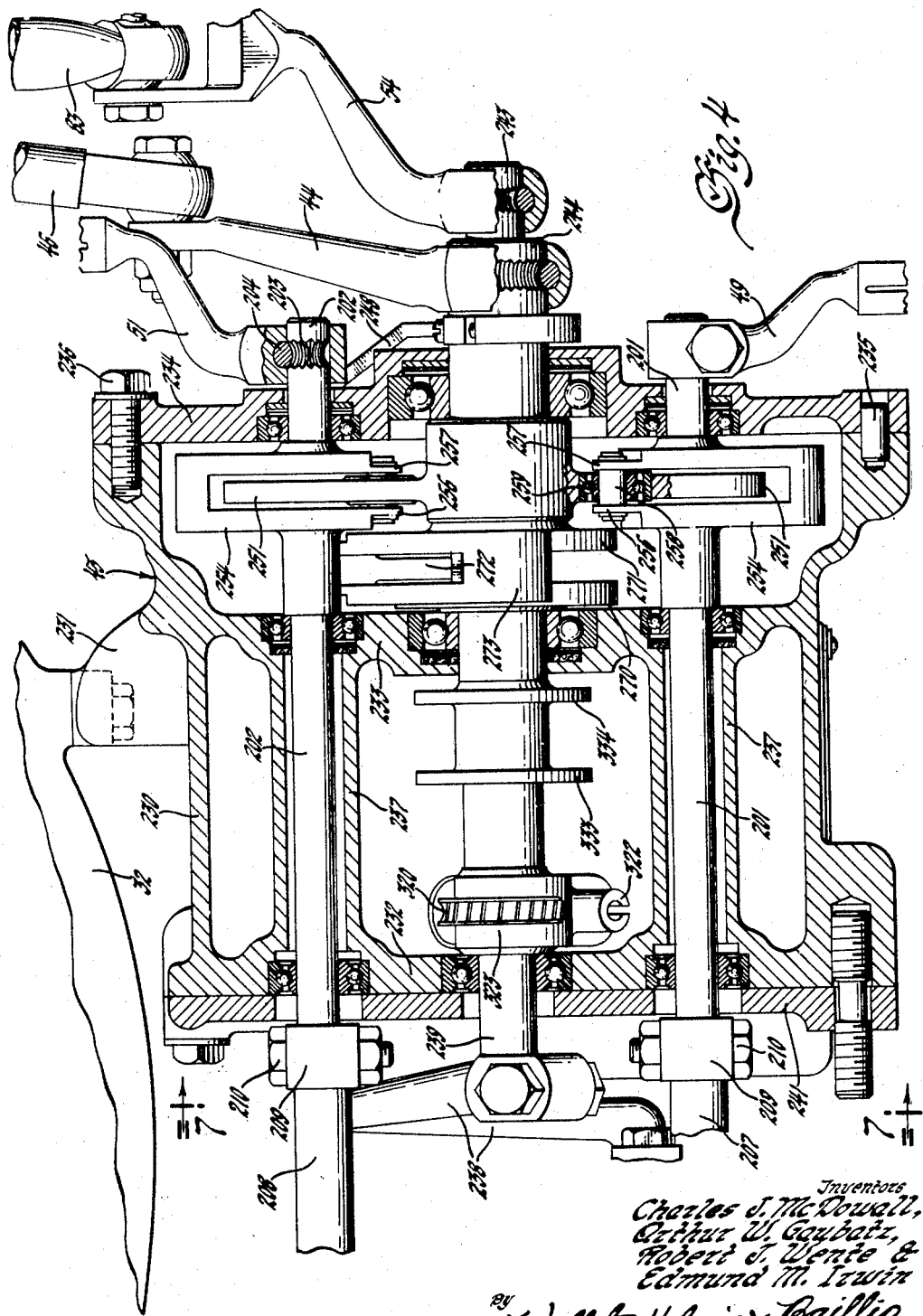

Inventors
Charles J. McDowall,
Arthur W. Goubatz,
Robert J. Wente &
Edmund M. Irwin
By Willits, Helwig & Baillio
Attorneys

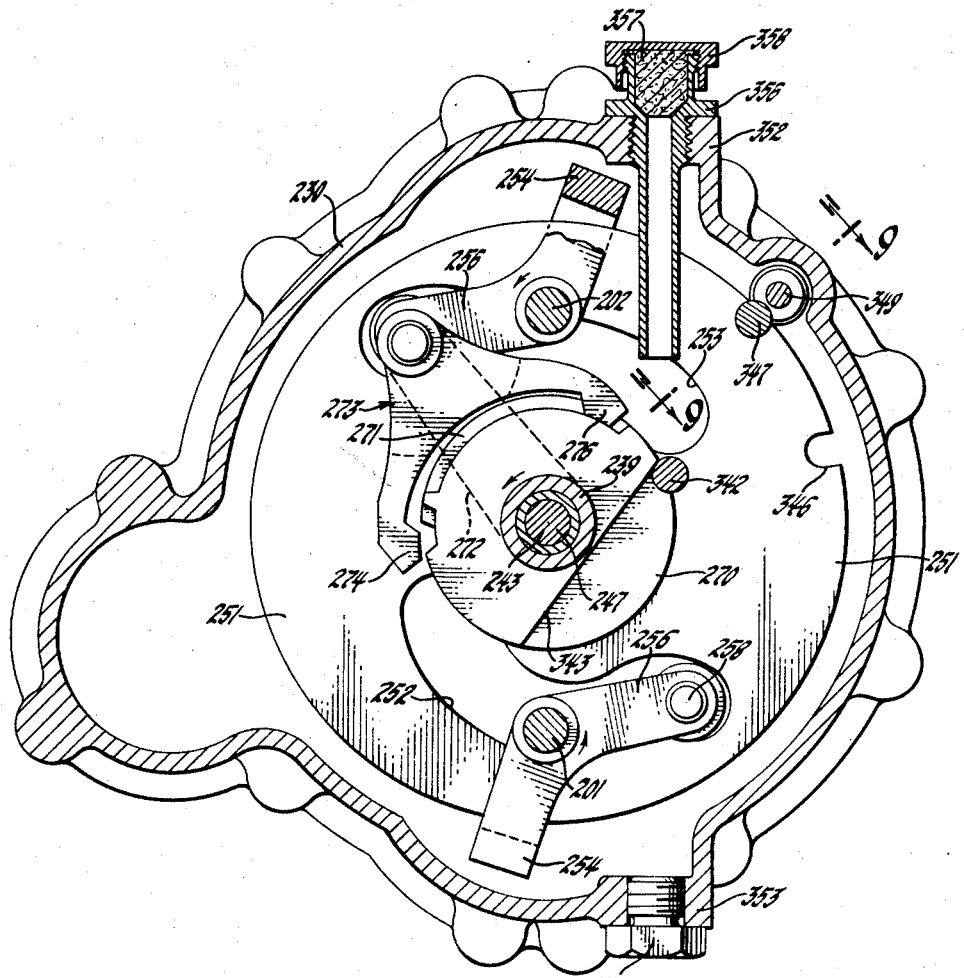
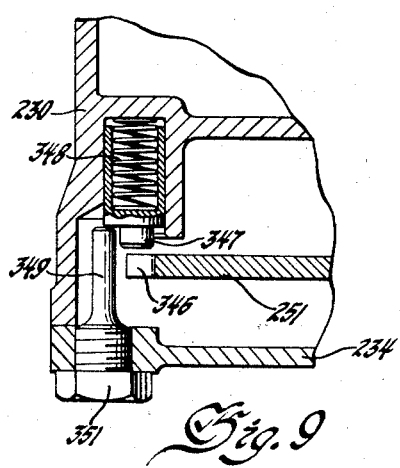

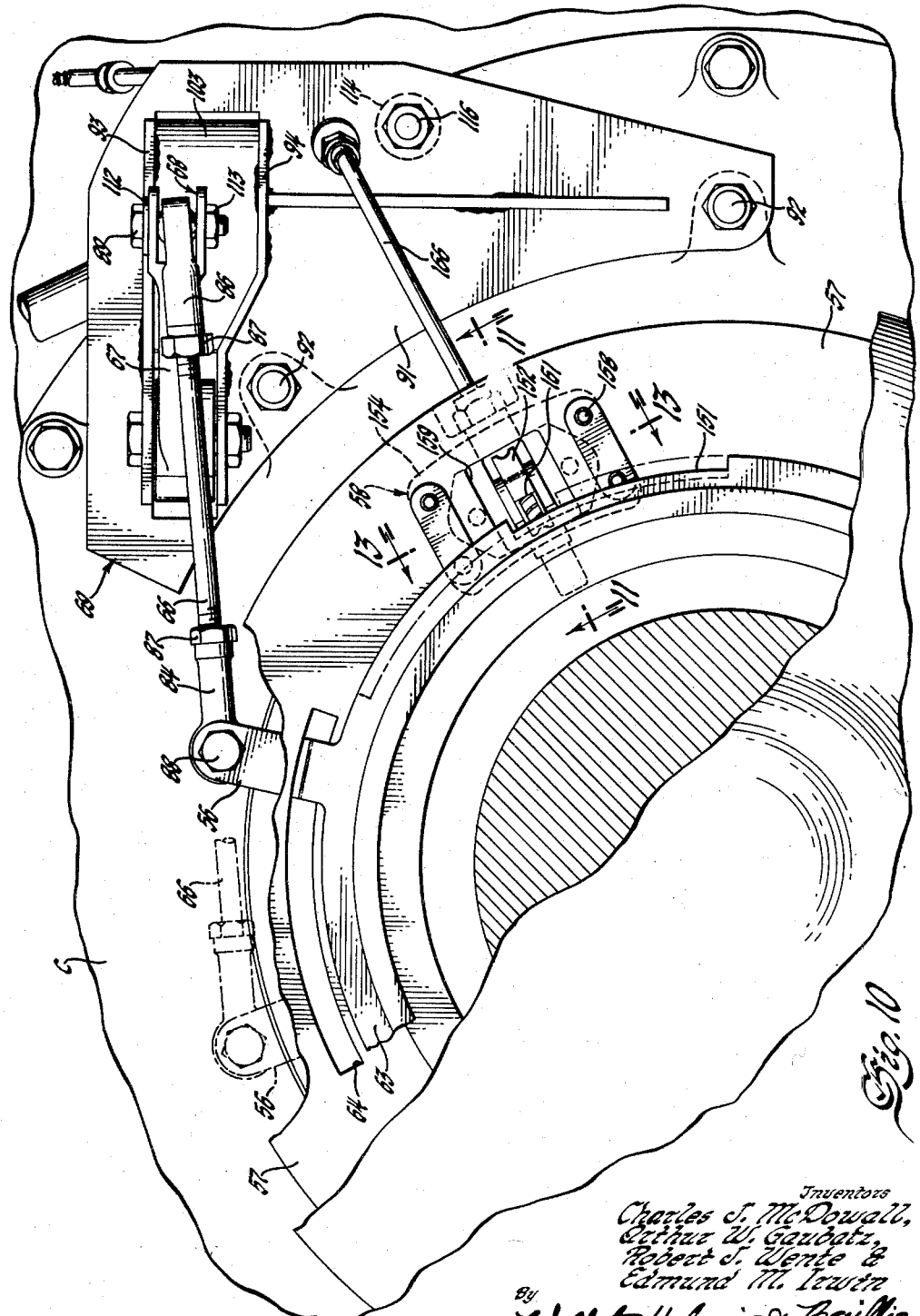

Inventors
Charles J. McDowall,
Arthur W. Gaubatz,
Robert J. Wente &
Edmund M. Irwin
By Willits, Helwig & Baillio
Attorneys

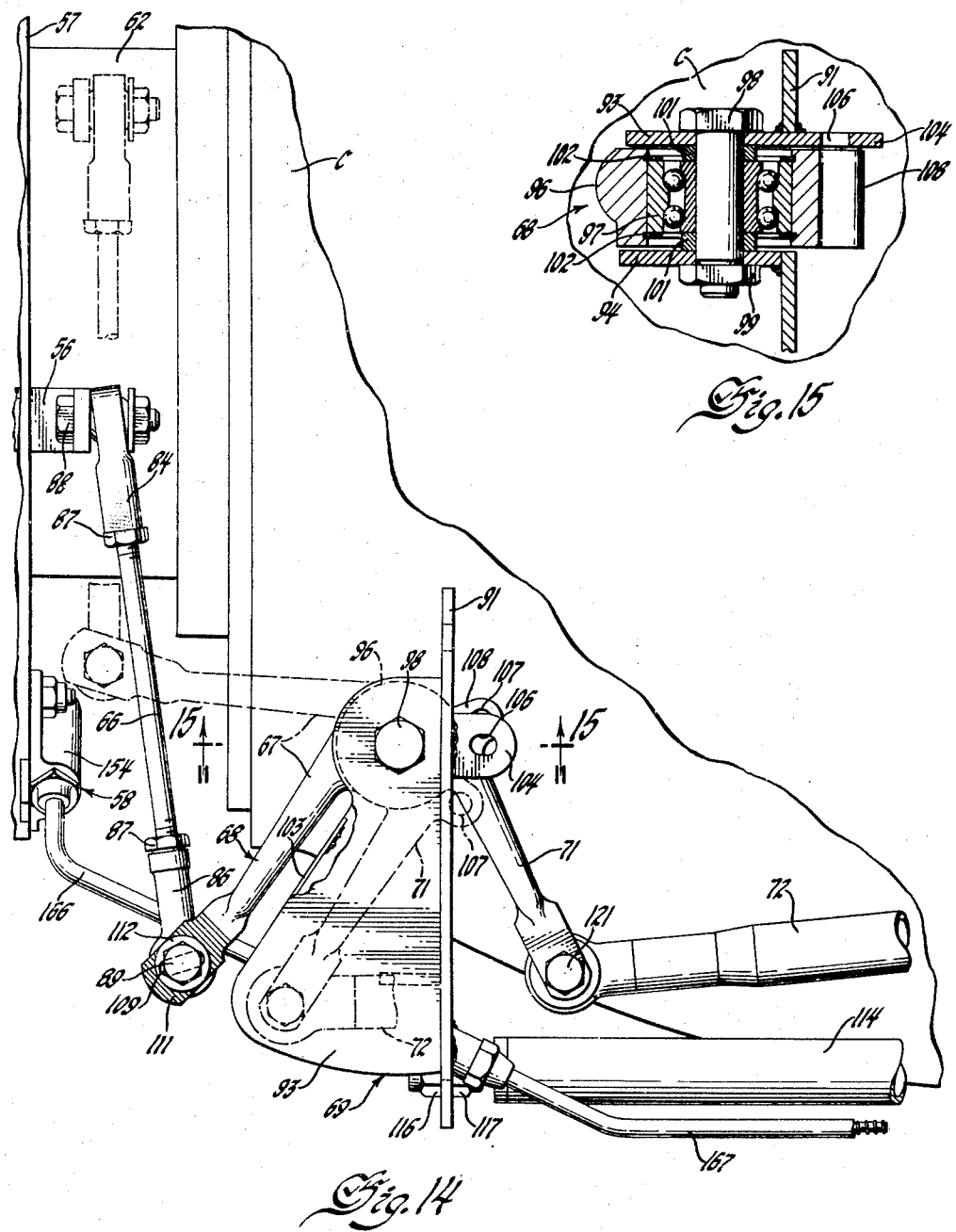

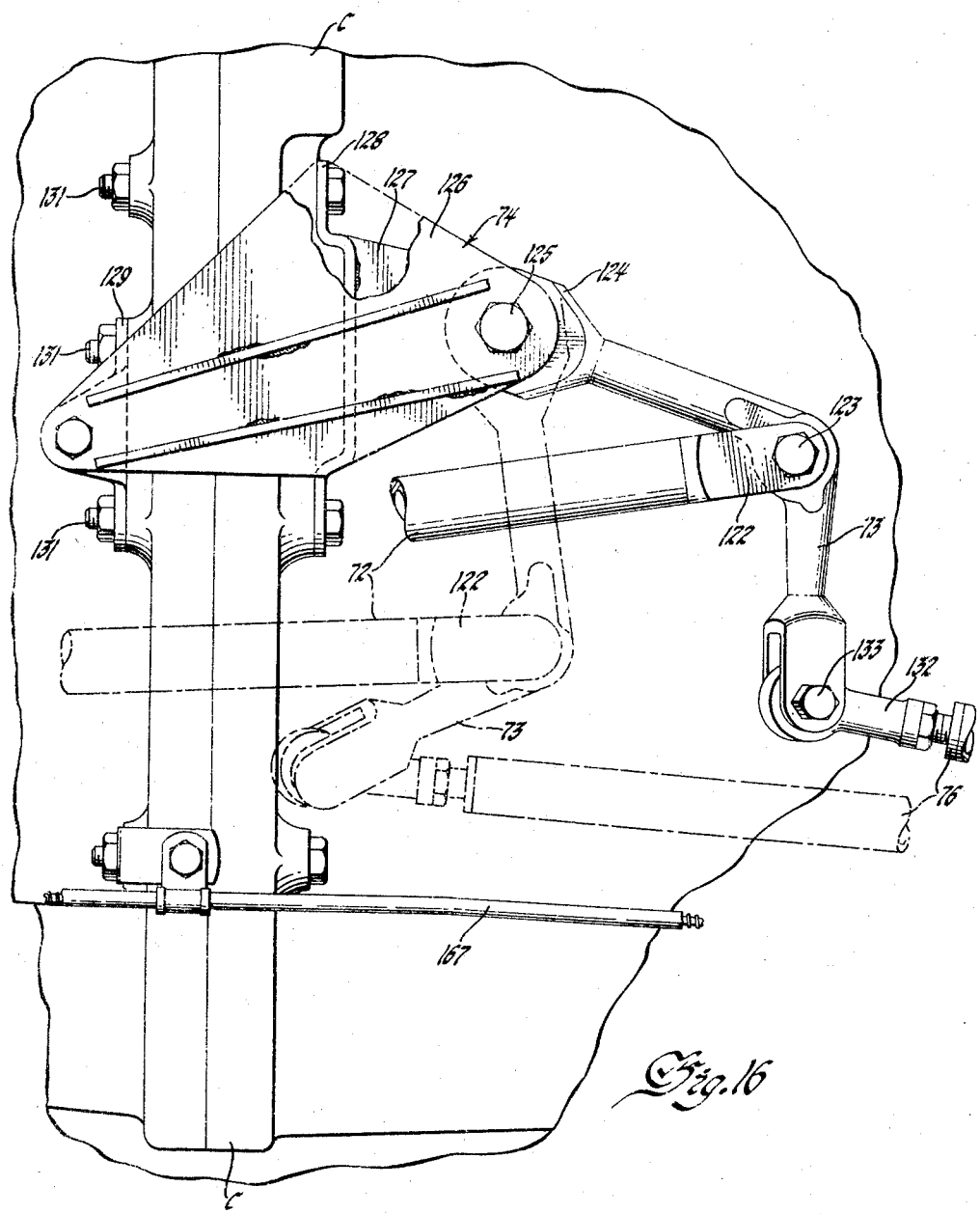

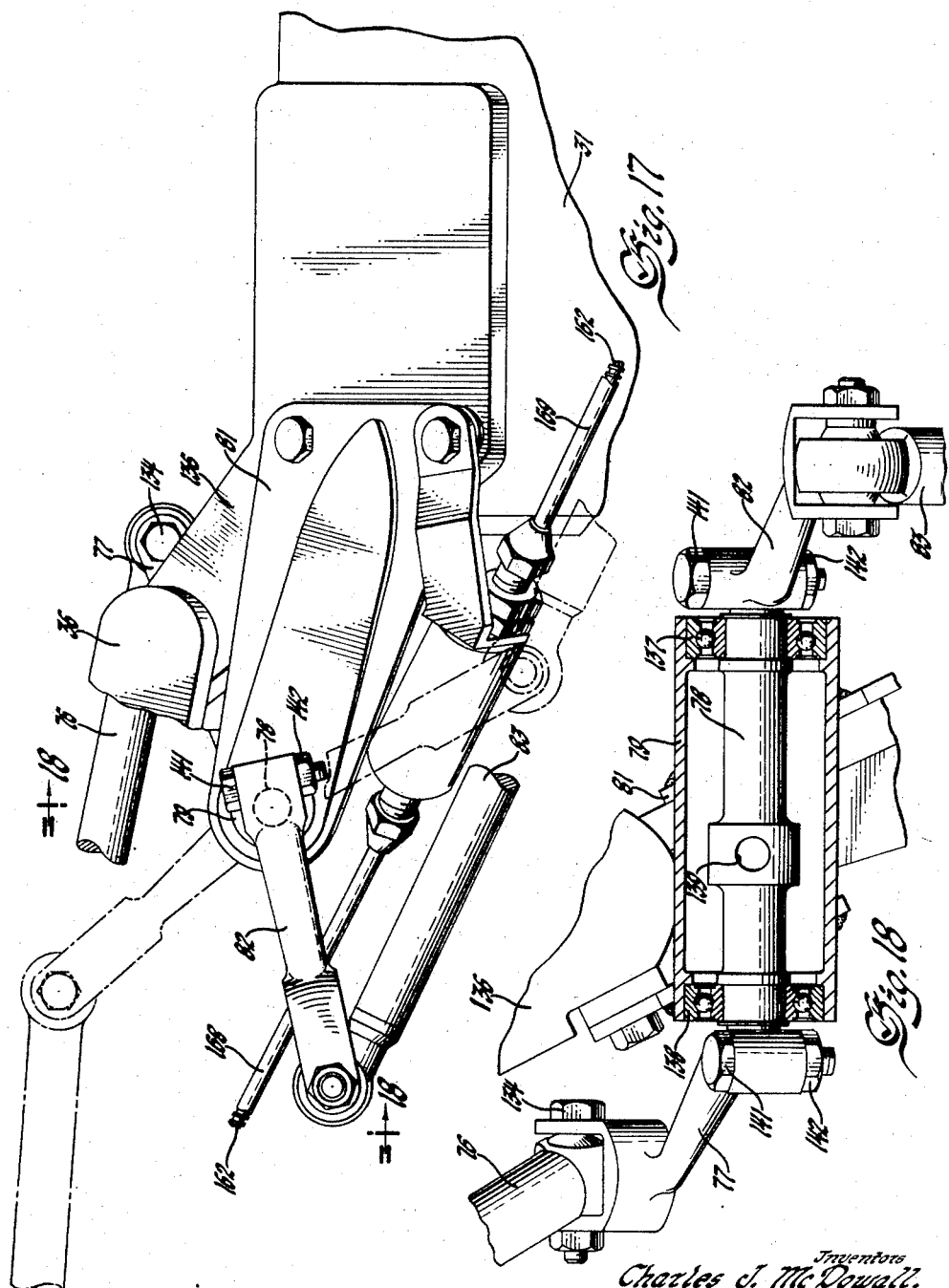

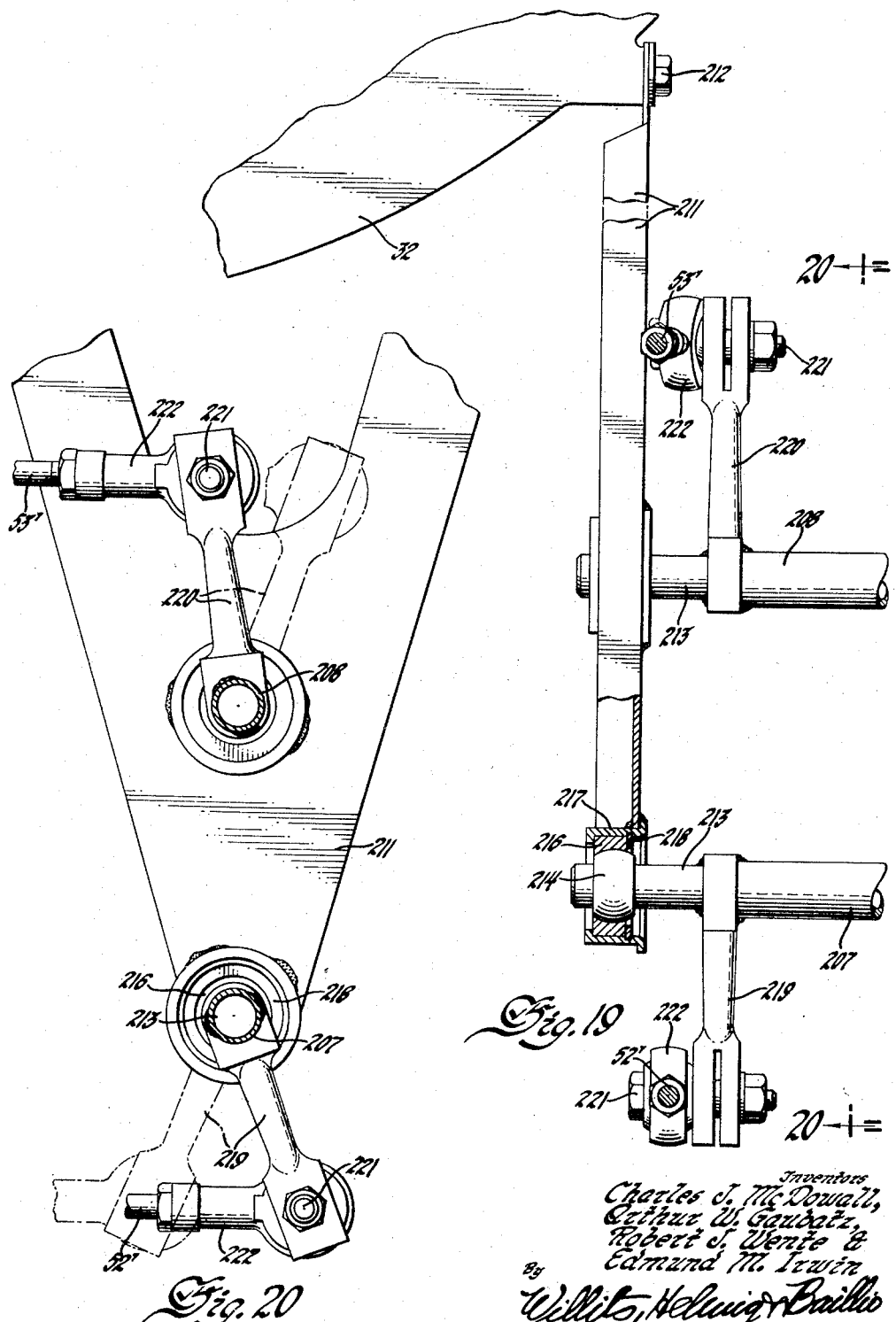

Nov. 18, 1958     C. J. McDOWALL ET AL     2,860,712
CONTROL FOR AIRCRAFT POWER PLANT

Filed Feb. 23, 1952                           17 Sheets-Sheet 15

Inventors
Charles J. McDowall,
Arthur W. Gaubatz,
Robert J. Wente &
Edmund M. Irwin.

By Willits, Helmig & Baillio
Attorneys

United States Patent Office 2,860,712
Patented Nov. 18, 1958

2,860,712

CONTROL FOR AIRCRAFT POWER PLANT

Charles J. McDowall, Arthur W. Gaubatz, Robert J. Wente, and Edmund M. Irwin, Indianapolis, Ind., assignors to General Motors Corporation, Detroit, Mich., a corporation of Delaware Application February 23, 1952, Serial No. 272,922

19 Claims. (Cl. 170—135.74)

Our invention relates primarily to controls for aircraft power plants of the turboprop type although, as will be apparent, features of the invention are applicable to power plant installations of other types. The preferred embodiment of the invention relates to the control of an aircraft plant in which a propeller is driven through clutches and a reduction gear by two gas turbine power units. A power plant of this sort is described generally and a system of control therefor is disclosed in detail in the United States application of Irwin et al., Serial No. 194,716, filed November 8, 1950 (Patent No. 2,851,113). The control system of the present invention is for a power plant of generally similar configuration to that described in the Irwin et al. application and the control system has, in general, the same functions as the control system of the aforesaid application.

The control system of this invention has been conceived with a view to attaining certain advantages over the control system of Patent No. 2,851,113. Some of the more important differences between the present and the previously disclosed control system are as follows: A single power control lever (for operation by the pilot or flight engineer) provides for control of both of the power units geared to a common propeller, eliminating the need for two control levers per engine. This change, which is advantageous to the pilot in simplifying the operation of the aircraft, is attended by a simplification rather than an elaboration of the control system.

A further beneficial aspect of the invention resides in a significant simplification of the control system as a whole. Some of this simplification may be attributed to the elimination of certain automatic features, but a great part of the simplification results from new principles embodied in this invention.

A further difference between the control system of this invention and that of the prior application lies in the employment to a considerable extent of mechanical actuation systems rather than electrical. This change, as carried out in accordance with the principles of the invention, results in a less complex control system and promises easier maintenance.

Many other distinctions between the present control system and that of the aforesaid application will be aparent from consideration of the succeeding detailed description of the preferred embodiment of this invention.

The pricipal object of the invention is to provide a highly flexible yet simple control system for an aircraft power plant; a further object is to provide an improved control system for a dual power unit turboprop engine; a further object is to provide a control system of this character in which both power units are primarily controlled by a single lever.

Other objects of the invention are to provide a control system providing the maximum flexibility of operation of a turboprop power plant; to provide an improved system for coordinating the operation of the propeller with the power units; and to provide direct mechanical actuation of certain phases of power control.

Still other important objects of the invention are to provide a control system for a gas turbine aircraft power plant which will greatly facilitate the operation of an aircraft and to provide a control system which is light, compact, and reliable.

The manner in which these and other objects are achieved and the advantages of the invention will be apparent to those skilled in the art from the succeeding detailed description of the invention.

Figure 6:
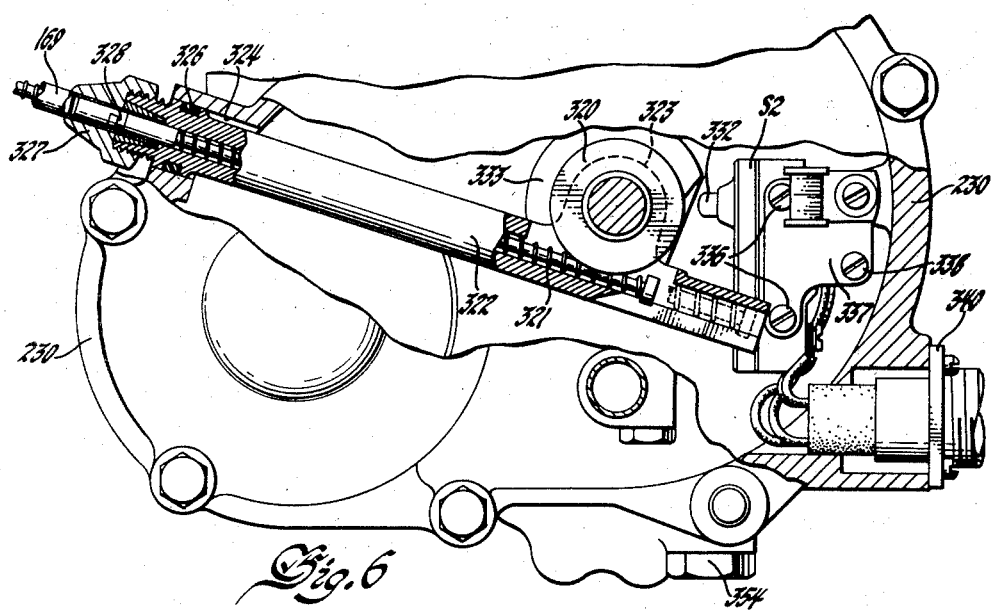
Figure 7:
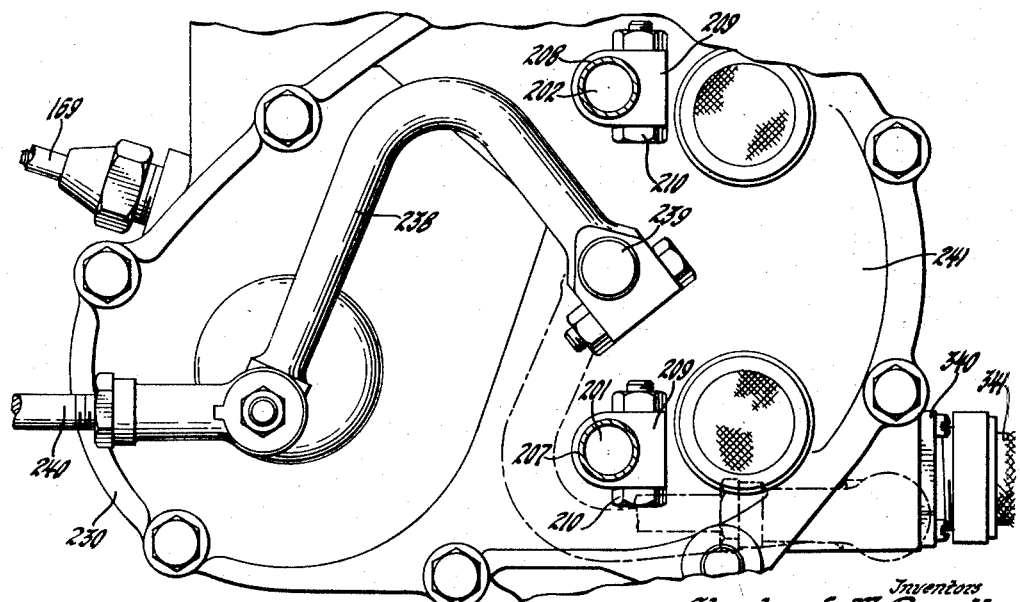
Figure 11:
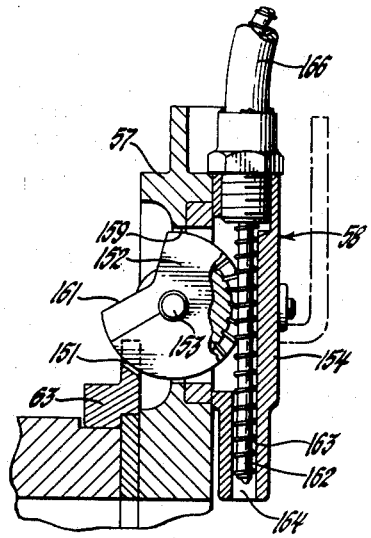
Figure 13:
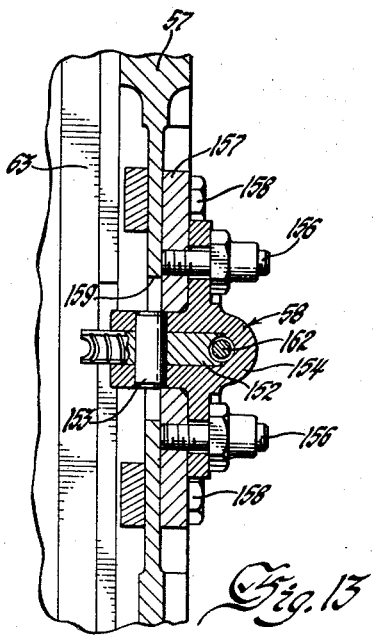
Figure 12:
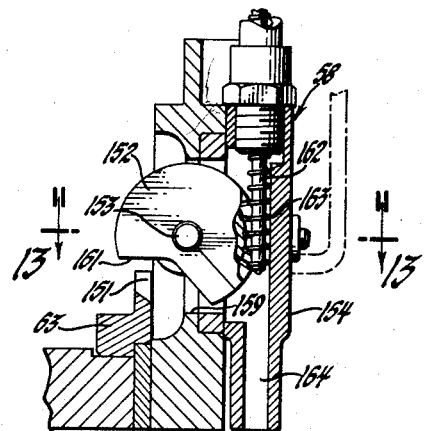
Figure 21:
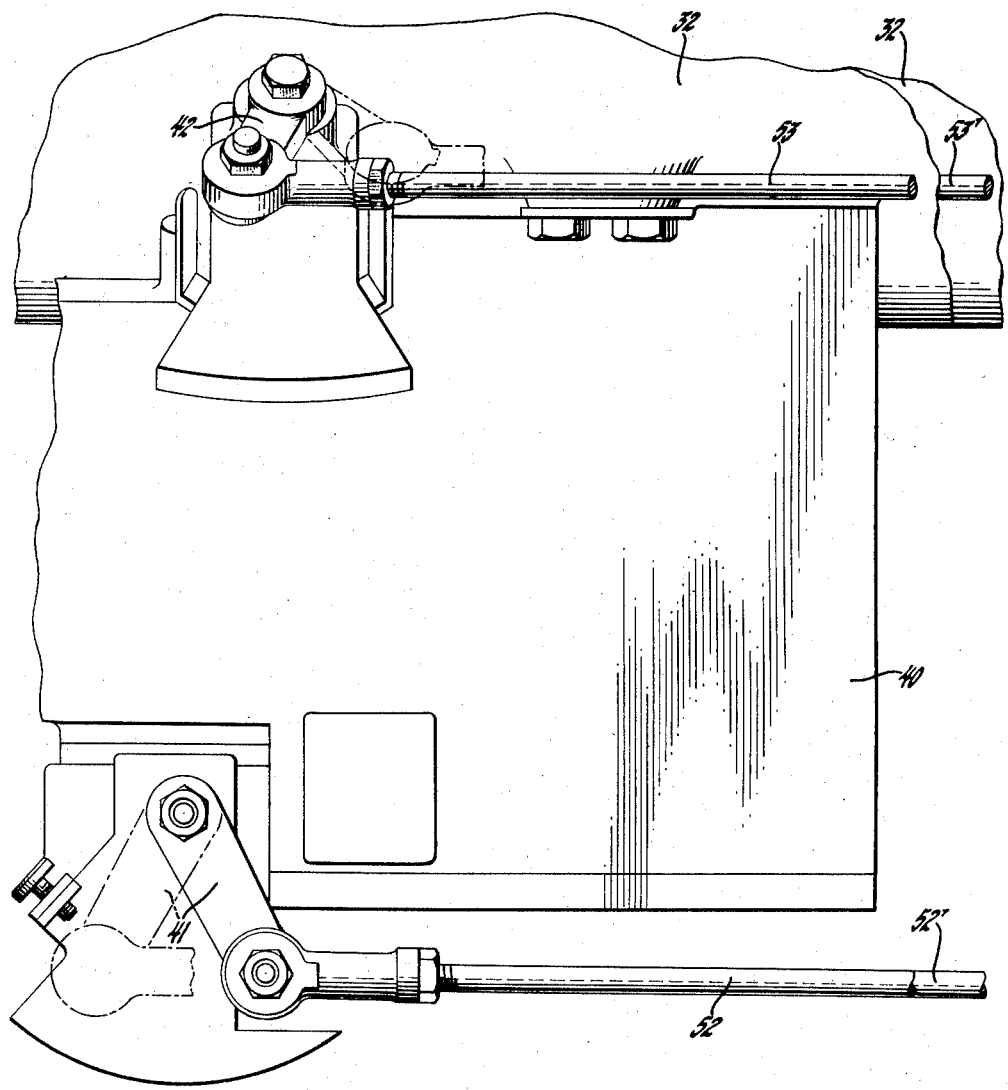
Figure 22:
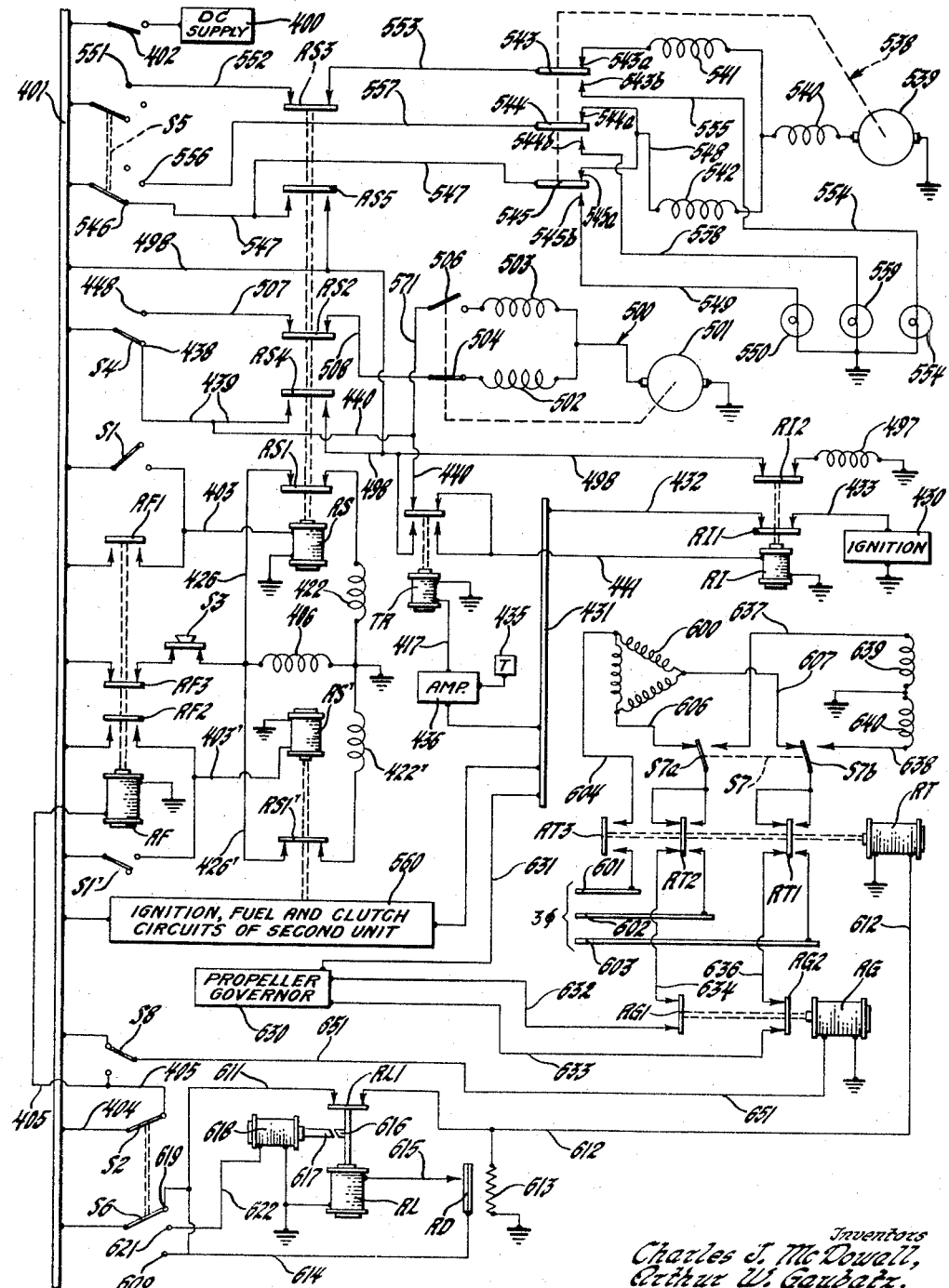
Figure 23:
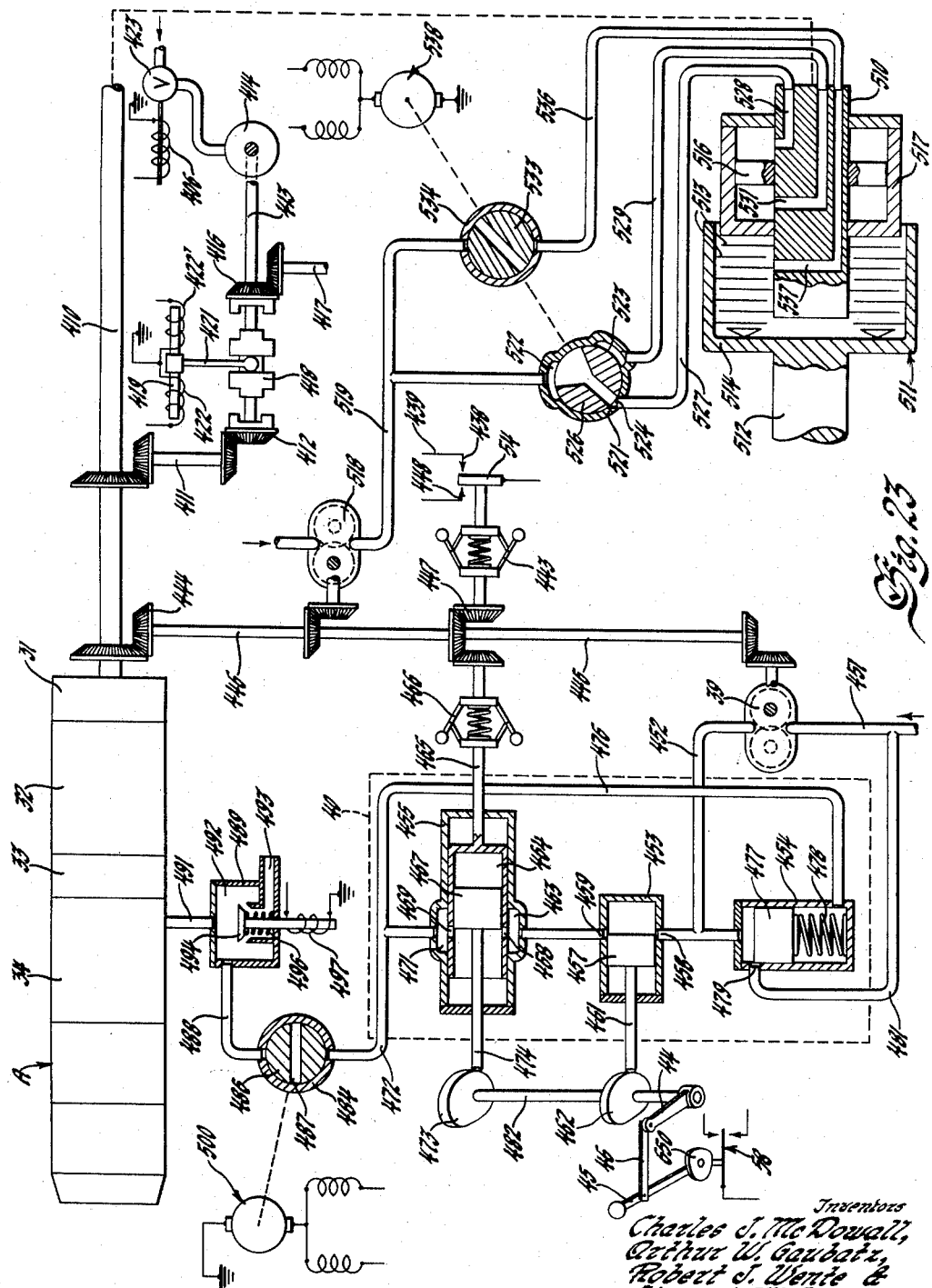
Figure 24:
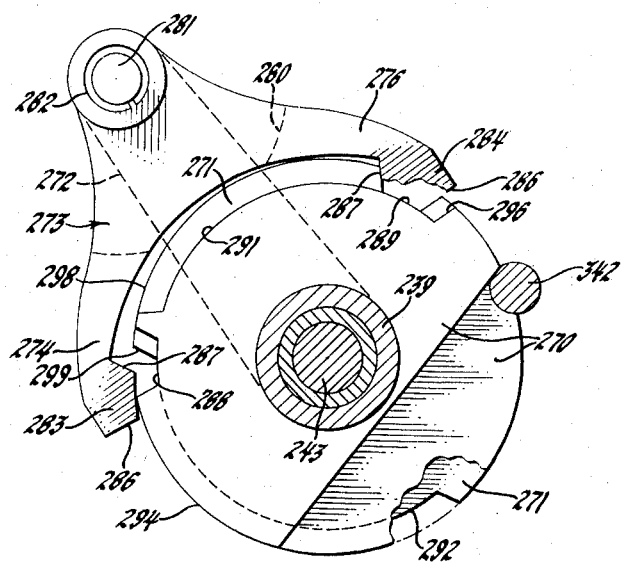
Figure 25:
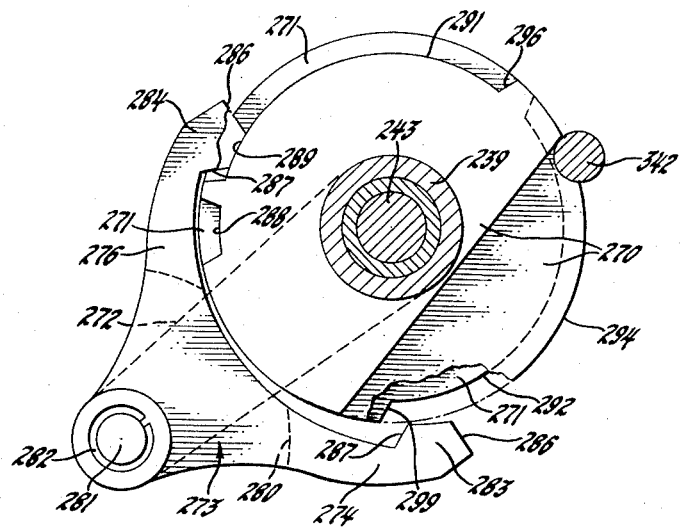
Figure 26:
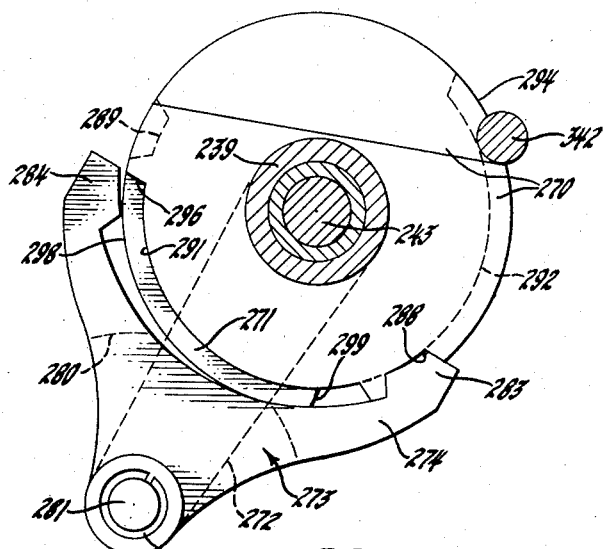
Figure 27:
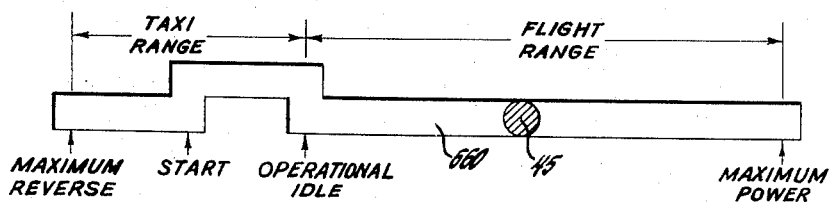
Figure 28:
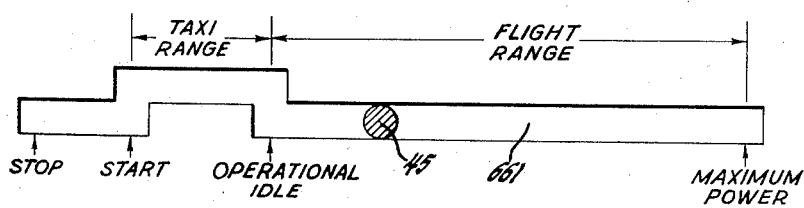

Referring to the drawings: Fig. 1 is a plan view of a turboprop engine incorporating the control system of the invention; Fig. 2 is a left side elevation of the same; Fig. 3 is a left side elevation view of a coordinating control device; Figs. 4 and 5 are sectional views of the same taken on the planes indicated in Fig. 3; Fig. 6 is a partial right side elevation view of the coordinating control with certain parts cut away; Fig. 7 is a partial right side elevation view of the same; Fig. 8 is a sectional view of the same taken on the plane indicated in Fig. 5; Fig. 9 is a detail sectional view taken on the plane indicated in Fig. 8; Fig. 10 is a partial elevation of the forward or propeller end of the reduction gear; Figs. 11 to 13, inclusive, are sectional views illustrating principally the propeller quadrant lock, Figs. 11 and 13 being taken on the planes indicated in Fig. 10, and Fig. 12 being taken on the same plane as Fig. 11; Fig. 14 is a partial plan view of the forward end of the reduction gear; Fig. 15 is a partial sectional view taken on the plane indicated in Fig. 14; Fig. 16 is a plan view illustrating the control linkage at the rearward end of the reduction gear; Fig. 17 is an elevation view illustrating the control linkage at the forward end of the power unit; Fig. 18 is a sectional view taken on the plane indicated in Fig. 17; Figs. 19, 20, and 21 illustrate the linkage between the coordinating control and the right hand unit fuel control, Fig. 19 being a sectional view taken on the plane indicated in Fig. 1, Fig. 20 a section taken on the plane indicated in Fig. 19, and Fig. 21 a side elevation of the forward end of the linkage at the fuel control; Fig. 22 is a circuit diagram of the electrical system; Fig. 23 is a schematic diagram illustrating certain features of the system; Figs. 24, 25, and 26 illustrate the discriminator device of the coordinating control in three different positions; and Figs. 27 and 28 are diagrams of two different schedules of the pilot's power control lever.

Introduction

By way of introduction to the more detailed description of the invention, the configuration of the power plant and the general nature of the control functions will be described briefly. Referring to Figs. 1 and 2, the power plant comprises gas turbine power units A and B of known type, a reduction gear assembly C, and a propeller D. Only the forward ends of the power units are shown. Each power unit comprises a forward frame 31, a compressor casing 32, and a midframe 33, these housing a compressor which supplies combustion apparatus 34. The combustion apparatus, only the forward end of which is indicated, powers a turbine (not shown) which drives the compressor and a power output shaft. The power output shafts are contained in shaft housings 35 and extend to the reduction gear assembly C. The reduction gear is structurally coupled to the power units by the shaft housings 35 and by a strut 36 extending from the reduction gear case to each power unit. This assembly of reduction gear and power units is described in a copending application of Charles J. McDowall, Serial No. 231,498, filed June 14, 1951 (now Patent No. 2,718,756. The reduction gear assembly C includes clutches by which each power unit is coupled to a common reduction gearing which drives the propeller assembly D. The clutches are fully described in the copending application of Peterson et al., Serial No. 174,052, filed July 15, 1950 (Patent No. 2,838,913). The reduction gear also provides for installation of an engine starter and various auxiliaries. The reduction gear drives two concentric counter-rotating shafts (not shown) on which are mounted a counter-rotating propeller 37, 38. The propellers may be of a known variable pitch type, operable in a blade angle control regime in which the blade angles may be set to desired values of both positive and negative pitch and in a governing regime in which the propeller pitch is automatically varied by a speed-responsive governor. The propeller may also be feathered. Such a propeller is shown in the application of Treseder et al., Serial No. 202,612 filed December 26, 1950 (now Patent No. 2,699,304).

The power plant may be operated with either one or both of the power units in operation. Each power unit has its separate fuel system including a fuel pump 39 (Fig. 23) driven by the unit and a fuel control 40 which regulates the amount of fuel fed to the unit and thereby the power output of the unit. The fuel control is of a known type and the details thereof are immaterial to the invention. Essentially, the fuel control bypasses a certain part of the output of the fuel pump and allows the remainder to flow to the combustion apparatus of the unit. Each power control includes a power input lever 41 and a speed input lever 42. The power input determines the basic setting of unit power output or fuel flow, which is varied by other factors to which the fuel control responds such as temperature and pressure of the air coming into the compressor. The speed input 42 sets an overspeed governor in the control which acts to limit the speed of the unit irrespective of the power setting. The power control also includes an automatic overriding control which decreases fuel flow in case of overtemperture conditions in the unit. The fuel control need not be further described because the general nature of the fuel control is known to those skilled in the art and because the control system of the invention is readily adaptable to fuel controls or power section controls of various types. However, for convenient reference, the essentials of a fuel control will be described subsequently.

The master control of the power plant is a coordinating control device 43 which performs a number of control functions in response to signals received from the pilot. The principal functions of the coordinating control are (1) to set the propeller to either a feathered condition, a desired blade angle setting, or to the speed governing mode of operation, (2) to operate the power control input 41 of both fuel controls, and (3) to operate the speed governor inputs 42 of both fuel controls. The term "coordinating control" is applied because the performance of all these three functions is interrelated to secure safe and economical operation of the power plant with the maximum flexibility of control. When the power plant is operating in a fixed blade angle condition, it may be employed for taxiing or for braking. The power and engine speed inputs 41 and 42 are properly coordinated with the blade angle setting of the propeller in blade angle control. In normal or speed governing control of the propeller, which is employed for takeoff and in flight, the coordinating control establishes the propeller governor in control of the propeller pitch, controls the power input 41 to provide flexibility of performance and sets the speed governor input 42 to a high enough speed value to avoid conflict between the fuel regulator and the propeller governor. In addition, if desired, the coordinating control may transmit a speed signal to the propeller governor which varies with the power setting. In the control system disclosed herein, however, this variable propeller speed feature is eliminated in the governing range of operation. The coordinating control is provided with two input levers, a lever 44 connected to a pilot's power control or throttle lever 45 (Fig. 23) by a link 46 and any suitable interconnecting mechanism, and a feather lever 47 connected by linkage indicated generally at 48 to a feather lever actuatable by the pilot. Normally, the coordinating control is actuated by the input lever 44, the lever 47 being operated only to unfeather or feather the propeller.

Through mechanism to be described, the coordinating control operates output crank arms 49 and 51 which are connected by links 52 and 53 respectively to the power and governor input arms 41 and 42 of the speed governor of the left hand or A power unit. The coordinating control is similarly coupled to the fuel control 40 of the left hand or B unit so that the same control signals are transmitted to both fuel controls.

The coordinating control also actuates an output arm 54 which controls the propeller D through an arrangement of links and levers which mechanically actuate a control lever 56 on the propeller D. Movement of the lever 56 affords complete control of the propeller, feathering and unfeathering the propeller, setting the pitch in the blade angle control regime, and establishing governor control. The actuation of the lever 56 is also under control of a quadrant lock device 58 mounted on a fixed disk 57 forming part of the propeller hub. The quadrant lock is released by mechanism in the coordinating control acting through a flexible control rod mounted in a tube 59 extending from the control to the propeller. This mechanism is a safe feature to prevent accidental feathering of the propeller due to misalignment of the linkage mechanism which provides the direct control of propeller operation.

In addition to these functions, the coordinating control operates certain switches to be described.

Thus, the pilot's power control lever, through the coordinating control, directs all normal operation of the power units and propeller, both in flight and during starting, engine warmup, or taxiing. Feathering and unfeathering are effected by the pilot's feather lever acting through the coordinating control.

The overall operation of the system will be further discussed after a description of various component mechanisms.

*Propeller control linkage*

Referring first to Figs. 1, 2, 10, and 14, the rear propeller 37 includes a hub or spinner 61 which is rotatable upon a fixed structure including a rear plate 57, this fixed structure being mounted on the nose of the reduction gear by a hollow column 62 through which the propeller shafts extend. The internal control or pitch changing mechanism of the propeller will not be described, since the details thereof are immaterial to the invention. It is sufficient for our purposes to state that the control of the propeller is effected by a ring 63 (Fig. 10) which is rotatable through a limited arc on the fixed structure of the propeller hub. The arm 56 extends from the ring 63 through a slot 64 in the rear plate 57 of the propeller. In the control system described in the above-mentioned Patent No. 2,851,113, the arm 56 is set to the desired position by an electrical actuator controlled by an electrical follow-up system. In the control apparatus of this invention the arm 56 is mechanically connected to the coordinating control 43 by mechanism which will now be traced from the arm 56 to the coordinating control.

In general outline, the arm 56 is actuated by a front link 66 coupled to one arm 67 of a bellcrank lever 68 fulcrumed on a bracket 69 mounted on the forward end of a reduction gear casing C. The second arm 71 of the bellcrank is coupled by a second link or pull rod 72 to a lever 73 (Figs. 1 and 16) pivoted in a bracket 74 mounted near the rear end of the reduction gear casing. The lever 73 is actuated by a third link 76 which extends to an arm 77 (Figs. 2, 17, and 18) which is fixed on a shaft 78 rotatable in a sleeve 79, supported by a bracket 81, fixed to the forward frame 31 of the power unit A. An arm 82 fixed to the shaft 78 is coupled by a fourth link 83 to the propeller control output arm 54 of the coordinated control (Figs. 2 and 3). It will thus be seen that movement of the lever 54 by the coordinating control rotates the control ring 63 of the propeller. In Figs. 10, 14, 16, and 17 the parts of this mechanism are shown in solid lines in the position of full reverse pitch of the propeller and in broken lines in the position to feather the propeller, these positions being the extremes of the range of movement of the parts.

Proceeding to a description in somewhat greater detail of this actuating linkage, the ends of the link 66 (Figs. 10 and 14) are provided with commercial ball joint fittings 84 and 86 which are threaded onto the ends of the rod so that the effective length of the rod 66 may be adjusted. Jam nuts 87 secure the fittings in position after they are adjusted. A bolt 88 extends from the arm 56 through the ball of the fitting 84 and a bolt 89 through the ball of the fitting 86. The end of the lever arm 67 is clevised to receive fitting 86. The bracket 69 comprises a plate 91 secured to the reduction gear case C by cap screws 92. Two horizontal plates 93 and 94 (Fig. 15) are welded to the plate 91. The hub portion 96 of the lever 68 is journaled between these plates by a two row ball bearing 97 mounted on a pin 98 extending through the plates and secured by nut 99. The inner race of the ball bearing is located by washers 101 bearing against the inner surface of the plates 93 and 94 and the outer race is located in the hub 96 by snap rings 102. A curved plate 103 welded to the forward and left end edges of the plates 93 and 94 defines with these plates a pocket into which the lever arm 71 moves in the forward part of its arc of travel, the plate 91 being cut away to pass the arm 71.

A tab 104 integral with the plate 93 extends through the plate 91 and is formed with a hole 106. In one position of the lever arm 68 this hole is aligned with a bore 107 in an extension 108 of the hub 96 of the lever. By rotating the lever 68 until a pin can be inserted through the holes 106 and 107 the lever 67 can be accurately located in a datum position for aligning the control linkage.

The effective length of the arm 67 may be varied by moving the pivot pin 89 in slots 109 in the clevised end of the arm. These slots are so oriented that with the lever 68 in its adjustment position determined by the holes 106 and 107 movement of the pin 89 in the slot does not change the position of the arm 56. The surface of the arm is serrated as indicated at 111, and the washer 112 under the head of the pin 89 is similarly serrated so that adjustment is preserved when the pin 89 is tightened in place by the nut 113.

The plate 91 is additionally supported by a post 114 extending from an intermediate flanged joint of the reduction gear casing C. The plate is clamped between nuts 116 and 117 on the threaded end of post 114.

The second link 72, which extends from the arm 71 to the lever 73 (Fig. 16), is provided with a ball joint fitting at the forward end which may be of a standard commercial type. The lever arm 71 is clevised and bored for a pin 121 which extends through the ball of the fitting. The rear end of the link 72 is provided with a clevis fitting 122 which is coupled by bolt 123 to an intermediate point on the lever 73. The bolt 123 is, preferably, mounted in ball bearings in lever 73 in a manner similar to the relation between the pin 98 and the lever 68 (Fig. 15). The hub end 124 of the lever 73 is rotatably mounted on ball bearings on a pin 125 similarly to the lever 68. The pin 125 extends between upper and lower plates 126 and 127 of a sheet metal bracket weldment comprising plates 128 and 129 which are retained by bolts 131 which join the intermediate and rear sections of the gear case C. The outer end of the lever 73 is clevised to receive the ball of a ball fitting 132 adjustably mounted on the forward end of the third link 76, the ball being held by bolt 133.

The third link or pull rod 76 extends from the reduction gear to the left-hand power unit A and is provided at its rearward end (Figs. 17 and 18) with a ball socket connection coupled to the clevised end of the lever 77 by a bolt 134. The rear end of the interconnecting structure 36 is attached to the forward frame 31 of the engine by a bracket 136.

The bracket 81 is attached to the forward frame 31 by two of the bolts which attach the bracket 136. Bracket 81 is a welded structure comprising the sleeve 79 within which the shaft 78 is mounted by ball bearings 137 and 138. The shaft 78 is horizontal. A transverse bore 139 in the shaft 78 provides an index point for locating the shaft for alignment purposes by means of a pin which may be inserted through the bore 139 and holes (not shown) in the sleeve 79.

The arms 77 and 82 may be angularly adjusted with respect to the axis of the shaft 78 for aligning the control linkage by means of any suitable mechanism, preferably that described subsequently with respect to arm 51. The arms are adjusted by machine screws 141 and locked by nuts 142.

The fourth link 83 (Figs. 1, 3, 17, and 18), which connects the arm 82 to the pitch control arm 54 of the coordinating control, is a tube on the ends of which ball joint fittings are fixed. These are attached by means of bolts to clevises in the arms 82 and 54. The arm 54 is adjustable about the shaft upon which it is mounted.

The means by which movement of the lever 54 is transmitted to the control arm 56 of the propeller will be clear from the foregoing. It should be noted that the linkage compensates in large measure for thermal expansion of the compressor casing 32 and the reduction gear case C in operation. This is achieved by reversing the direction of movement in the rocker arms 77 and 82 so that the links 72 and 83 move in opposite directions. As a result, expansion of the reduction gear case tends to move the arm 56 in one direction and expansion of the compressor tends to move it in the opposite direction. Thus, these two possible sources of error largely cancel each other.

It may be noted that rocker arms 77 and 82 and shaft 78 constitute in effect a lever of the first class fulcrumed on the power unit.

It should also be noted that the arrangement of the control linkage facilitates repair and maintenance of the engine if the reduction gear C or power unit A is to be removed from the engine. The link 76 may be removed, leaving the remaining parts of the control linkage on the reduction gear and the power unit.

The numerous adjustment points provide for proper alignment of the control linkage so that the positions of the propeller input ring 63 correspond in the desired manner to the positions of the shaft on which the arm 54 is mounted.

*Mechanical feather lockout*

Very little misalignment of the propeller control linkage is to be expected and a small degree of misalignment would not seriously affect the operation of the system. However, in the propeller for which this system is intended, the speed position of the control ring 63 and arm 56 for speed governing operation is rather closely adjacent to the feather position indicated by broken lines in Fig. 10. As will be apparent, if a misalignment should be sufficient to move the propeller control to the feather position when the engine is operating at full power, a serious casualty might result. For this reason, a safety device in the form of a lock device 58 which positively prevents movement of the propeller control to feather unless the lock is released is provided. The lock is released by the movement of the coordinating control which moves the propeller control arm 54 to its feather position so that the lock cannot be released unless the coordinating control is operated by the pilot to feather the propeller.

This safety interlock is also a mechanical arrangement to minimize possibility of failure due to electrical troubles. Referring to Figs. 10 to 13, a sector or notch 151 is cut in the outer edge of the control ring 63, the abutments at each end of which cooperate with a latch wheel 152 rotatable on a shaft 153. This shaft is mounted in ears projecting from a housing 154 which is secured by studs 156 to a plate 157. The plate 157 is fixed to the rear plate 57 of the propeller by cap screws 158. The wheel 152 extends through an opening 159 in the plate 57 so that the wheel 152 is disposed in the notch 151 of the control ring 63. The wheel 152 is cut away to provide a notch 161. When the wheel is in the position of Fig. 11, it permits movement of the ring 63 through its range of travel except that movement into the feather position is blocked by the wheel. When the wheel is rotated to the position of Fig. 12, the notch 161 is aligned with the ring 63 so that movement into the feather position is permitted.

The wheel 152 is formed similar to a worm wheel on its periphery so that it may be rotated by a commercial flexible actuating cable 162 known as a "Teleflex" cable. This flexible cable is formed with a helical wire 163 fixed to its outer surface which actuates the wheel 152 in the manner of a rack and pinion. The details of the flexible cable 162 are immaterial to the invention and it is a commercially available article of manufacture. The cable 162 will transmit movement in both directions as long as it is guided in a suitable tube or conduit. The forward end of the cable is guided in a bore 164 in the housing 154. The remainder of the cable is guided in tubes indicated generally by the numeral 59 in Figs. 1 and 2 extending to the coordinating control 43. More specifically, a tube 166 extends from the housing 154 to the plate 91 (Figs. 10 and 14), a tube 167 extends from the plate 91 to the rear end of the reduction gear (see also Fig. 16), a tube 168 (Fig. 17) extends from the tube 167 to the forward end of the power unit, and a tube 169 extends from the forward end of the power unit to the coordinating control. The tube assembly 59 is supported in brackets at suitable points and unions or disconnectable arrangements are provided between the several sections of the tube 59. The cable 162 is likewise provided with disconnectable couplings at the points where the enclosing tube 59 is jointed so that this cable may be readily assembled and may be taken apart and easily disassembled from the power plant. The conduit connections may be of standard aircraft type and the cable connectors are preferably of the known commercial type of trade name "Teleflex" so that no detailed description of the structure is necessary.

The manner in which the cable 162 is actuated by the coordinating control will be described later.

*Fuel control linkages*

The fuel control linkage to the fuel control 40 of the A power unit has been described briefly. By means of cross shafts extending from the coordinating control to the B unit, the same values of the power and speed inputs are fed into both fuel regulators.

Referring to Figs. 1 to 4 and 19 to 21, and more particularly to Figs. 2 and 21, each fuel regulator 40 has an input arm 41 for the power input signal and an input arm 42 by which the speed governor is set. These are connected respectively by links 52 and 53 to the power and speed output arms 49 and 51. Links 53 are coupled to the arms at each end by conventional ball joint arrangements, and the ball joint fitting at the forward end of each link is adjustable longitudinally of the rod. The arms 49 and 51 are mounted on and driven by shafts 201 and 202 in the coordinating control device 43. These arms are adjustable angularly about the shafts and the effective lengths of the arms are adjustable. The preferred mechanism by which the adjustments may be realized is disclosed in an application of Arthur W. Gaubatz, Serial No. 186,095, filed September 21, 1950 (Patent No. 2,627,188). Other arrangements for this purpose may be employed. Referring to lever 51 on shaft 202 (Figs. 3 and 4), a worm gear 203 is cut in the shaft with which is meshed the threaded bolt 204 which may be turned to adjust the arm angularly and may be locked in place by the nut 205. The bolt 206 by which the arm 49 or 51 is coupled to the link 52 or 53 may be adjusted longitudinally of the arm as disclosed in the said Gaubatz application. The shafts 201 and 202 extend through the coordinating control and at the right side of the control are coupled to tubular crossover shafts 207 and 208 which extend to the right-hand power unit B. A collar 209 on each shaft mounts a machine screw 210 which engages a worm on the end of shaft 201 or 202 to provide a coupling adjustable angularly in the same manner as arm 51 is adjustable. Referring to Figs. 19 and 20, the outer ends of the crossover shafts 207 and 208 are supported by a V-shaped sheet metal bracket 211 which is attached to the compressor casing 32 of the B unit by cap screws 212. Self-aligning or spherical bearings provided at the outer ends of the shafts 207 and 208 are received in the bearing bracket 211. Referring to the shaft 207, a solid shaft 213 mounting the ball 214 is fixed to the end of the shaft. The ball is journaled in the bearing 216 retained in a socket 217 welded to the bracket 211 by snap ring 218. The shaft 208 is similarly journaled. This arrangement prevents binding of the shafts due to expansion of the engines or distortions which may result from engine torque or dynamic loading in flight.

An arm 219 is welded to the outer end of the shaft 207 and a similar arm 220 to the end of the shaft 208, these arms corresponding to the arms 49 and 51 respectively which control the A power unit. Bolts 221 which may be adjusted longitudinally of the arms to vary the effective lengths of the arms mount the ball members of ball joint fittings 222 at the rear end of links 52' and 53' which extend to the power and speed governor input levers of the B unit fuel regulator, which is identical with that of the A unit. The links 52' and 53' are coupled to the fuel regulator in the same manner as the links 52 and 53 illustrated in Fig. 21.

It will be seen that the effective lengths of the arms 49, 51, 219 and 220 may be adjusted to establish the correct range of travel of the inputs to the fuel controls and the angular positions of these arms and the lengths of the connecting links may be varied to give correct indexing and uniform travel of the inputs to the fuel controls, assuring accurate coordination of the signals transmitted to the two fuel controls by the coordinating control.

*The coordinating control*

The arrangements by which the propeller controlling, power controlling and governor setting signals are transmitted from the coordinating control to the propeller and fuel regulators have been described. Considering now the structure of the coordinating control, with reference to Figs. 3 to 9, it may be noted that the coordinating control 43 is contained in a case 230 integral with brackets 231 by which it is suspended from the compressor casing 32. The casing 230 is roughly cylindrical and is closed by a bearing mounting plate or spider 232 at the left end. A second spider 233 is integral with the casing near the center. An end plate 234 is mounted on the right side of the coordinating control by cap screws 236 and locating pins 235. The plates 232, 233, and 234 provide support for a number of shafts in the coordinating control, including the shafts 201 and 202 which actuate the fuel regulators. These shafts extend through tubular housings 237 between the plates 232 and 233 and are supported in ball bearings in the plates. The feather input from the pilot to the coordinating control is effected through a pull rod 240 connected to an arm 238 adjustably clamped to the feather input shaft 239 (Figs. 4, 5, and 7), journaled in the webs 232 and 233. A bearing for shaft 239 is retained in plate 233 by a cover plate 241 secured to the end of the casing by cap screws. The propeller control arm 54 and the pilot's power control input arm 44 are mounted, with provision for angular adjustment, on concentric shafts 243 and 244, shaft 243 being journaled within the shaft 244. Shaft 244 is journaled in a ball bearing 246 in the cover plate 234. The inner end portion 247 of the inner shaft 243 is piloted in a bushing in the end of the feather shaft 239. A pointer or index 248 clamped on the shaft 244 traverses a scale 249 bolted to the cover plate 234 to indicate the angular position of the shaft 244 for adjustment or calibration of the control.

A cam disk 251, fitted against a shoulder on the output shaft 244 and splined to the shaft at 250, actuates the fuel control shafts 201 and 202 (Figs. 4, 5, and 8). Two cam slots 252 and 253 (Fig. 8) are cut through the cam disk 251 to operate the output shafts 201 and 202, respectively. These shafts each include a yoke 254 which extends around the margin of the disk 251 and includes two arms 256 and 257 between which a shaft 258 extends through the cam slot, the shaft being retained by snap rings. A ball bearing 259 on each of the shafts 258 serves as a follower in the cam slot 252 or 253, the width of which substantially equals the diameter of the outer race of the ball bearing. As will be apparent, rotation of the disk 251 rotates the shafts 201 and 202. The contour or form of the cam slots is a matter of design, depending upon desirable operating conditions, the characteristics of the propeller and power units, the specific design of the fuel regulator, and the motion transmitting characteristics of the linkages between the shafts 201 and 202 and the regulators. From these known conditions the appropriate form of the cam slots may be developed without difficulty to establish the proper and desired coordination between the signals sent to the propeller and to the fuel controls.

The propeller control output shaft 243 is normally moved by the power input control shaft 244 which is coupled to the pilot's power control or throttle lever. However, for unfeathering or feathering the propeller, the shaft 243 is controlled from a second pilot's control which may be termed the feather button (not shown) through link 240, arm 238, and shaft 239. The mechanism by which the shaft 243 is controlled by one or the other of these inputs may be referred to as a mechanical discriminator. This mechanical discriminator is described in detail and claimed in an application of Arthur W. Gaubatz entitled "Discriminator Device," Serial No. 254,142 filed October 31, 1951 (now Patent No. 2,778,241).

Essentially, the discriminator device (Figs. 4, 5, 8, and 24 to 26) comprises a disk 270 on the shaft 239 and a disk 271 on the shaft 244, an arm 272 integral with the shaft 243, and a coupling member 273 pivoted on the outer end of the arm 272 by a pin 281 retained by snap rings. The coupling member 273 comprises two arms 274 and 276 which engage the perimeters of both of the disks 270 and 271.

At the ends of the arms 274 and 276 are dogs or latches which engage notches in the periphery of one or the other of the disks 270 and 271. The arrangement is such that the arm 272 and thus the shaft 243 is coupled to whichever of the disks 270 and 271 is farthest advanced from its zero or datum position. Normally, the propeller control shaft 243 is thus coupled to the pilot's control input shaft 244 so that as shaft 244 is rotated the setting of the propeller control is varied accordingly. The contours of the slots 252 and 253 in the cam disk 251 are such as to insure coordination between the signals transmitted to the fuel control device and those transmitted to the propeller.

The pilot's power control lever, acting through the arm 44, thus effects all normal control lever pitch or speed governing setting. In order to feather or unfeather the propeller, however, the propeller input ring 63 (Fig. 10) must be rotated a maximum extent counterclockwise as viewed from the front of the propeller. To effect this movement, the propeller control arm 54 must rotate the maximum amount clockwise as viewed in Figure 3 or counterclockwise as viewed in Fig. 8. To feather the propeller, regardless of the position of the pilot's power control lever, the pilot's feather control is actuated and through the link 240 and arm 238 (Fig. 7) rotates the shaft 239 and disk 270 counterclockwise as viewed in Fig. 8. With the disk 270 thus rotated to an extent equal to the setting of the disk 271, the coupling member 273 couples the arm 272 and shaft 243 to the shaft 239. The shaft 239, when actuated to its full extent by the feather signal from the pilot's lever, rotates the shaft 243 beyond the maximum to which it may be moved by the shaft 244 and thus shifts the propeller control ring into the feather position. Since the propeller control shaft is decoupled from the shaft 244, this action does not affect the settings of the fuel regulators.

Describing the operation of the discriminator device more fully, with reference to Figs. 24 to 26, the coupling member 273, which acts to couple the arm 272 to one or the other of the disks 270 and 271, is slotted out as indicated at 280 so as to embrace the arm 272 and is pivoted on the arm by means of a pin 281 retained by snap rings 282. The ends of the arms 274 and 276 extend across the rims of both disks 270 and 271.

As will be clear from Figs. 24 to 26, the peripheries of the disks consist of portions of two different radii. The larger radius of both disks is the same, and likewise, the radii of the cutaway portions of both disks are the same. The coupling member 273 may rock to a limited extent on the pivot 281. One or the other of the arms 274 and 276 is always in engagement with a portion of greater radius of one of the disks, the other arm being thus forced inwardly to engage a surface of smaller radius. By this rocking motion, the coupling member is engaged for positive transmission of motion in either direction from one or the other of the disks 270 and 271 to the arm 272. Each of the arms 274 and 276 terminates in a dog or latch, 283 and 284 respectively, the external and internal faces 286 and 287 of which are inclined to a plane passing through the axis of the shafts and through the dogs so that the coupling member 273 can be cammed around its pivot 281 by rotation of the disks. The portions 283 and 284 act both as dogs and as cam followers, as will be seen. The disk 270 is provided with a driving notch 288 adapted to receive the dog 283 on the arm 274. The disk 271 is formed with a similar driving notch 289 adapted to receive the dog 284 on the arm 276. The shoulders which terminate the notches 288 and 289 effect driving engagement with the faces 286 and 287 of the arms of the coupling member.

Closely adjacent the notch 288 on the disk 270 is an extended portion 291 of small radius within which the dog 284 can travel over the disk 270. An extended portion 292 of small radius within which the dog 283 can slide is provided on the disk 271.

In Fig. 24, the disk 270 is shown in its initial or datum position from which it is rotated counterclockwise by the shaft 239. The disk 271 is very slightly advanced from its datum position, and with it the coupling member 273, arm 272 and shaft 243. It should be understood that the disk 271 may not be capable of rotating clockwise from the position shown in Fig. 24. It is spoken of as being advanced from its datum position since it is in advance of the disk 270 and is coupled to the member 273. In Fig. 25, the disk 270 remains in the datum position but the disk 271 has been rotated approximately 90° counterclockwise, carrying the arm 272 with it. In Fig. 26, the disk 271 remains in the same position as in Fig. 25, but the disk 270 has been fully advanced, carrying the arm 272 and shaft 243 still farther counterclockwise. It will be understood, of course, that regardless of the position of either of the disks 270 and 271 rotation of the other disk to a great extent from a datum position will carry the arm 272 ahead with which ever disk is farthest advanced.

The manner in which this is accomplished is as follows: It will be noted in Fig. 24 that the dog 284 of the coupling member is engaged in the notch 289 of disk 271, and dog 283 is riding on the portion 294 of full radius of the disk 270. The engagement of the dog 283 with the surface 294 holds the dog 284 in the notch 289. If the shaft 244 is rotated farther counterclockwise, toward the position of Fig. 25, the dog 284 remains engaged in notch 289 and slides over the portion 291 of the disk 270, the dog 283 sliding over the surface 294 of the disk 270. If the shaft 244 is returned toward its datum position, the coupling member is carried back by the disk 271.

Now, if we assume the disk 271 remaining in the position illustrated in Fig. 25 and the disk 270 being rotated from its datum position up to the angular extent of movement attained by the disk 271, the disk 270 at first turns freely without any effect on the coupling member 273. The surface 291 of the disk 270 slides under the dog 284 and the surface 294 slides under the dog 283. However, when the cam surface 296 of the disk 270 reaches the surface 286 of the coupling member, it acts to cam the dog 284 out of engagement with the notch 289. At the same time, the notch 288 in the disk 270 comes under the dog 283. When the dog 284 is engaged in the notch 289, the dog 283 is disposed above the surface 292 of the cam 271. Thus, as the surface 286 of the dog 284 moves outwardly, the dog 283 is free to move inwardly into the notch 288. The dog 283 thus engages the notch 288 of the cam 270 and the dog 284 is removed from engagement with the notch 289 in the disk 271. Further movement of the disk 270 thus carries the coupling member 273 with it, rotating the shaft 243 beyond the position to which it was moved by the shaft 244. The dog 284 moves over a portion 298 of full radius of the disk 271, which holds the coupling member in engagement with the notch 288 of the disk 270.

If the disk 270 is returned toward the position of Fig. 25 from the position of Fig. 26, the dog 283 is cammed outwardly by the surface 299 at the end of the portion 292 of the disk 271 and, thus, the dog 284 is dropped back into engagement with the notch 289 of disk 271.

It will thus be seen that the coupling member 273 engages with either disk for positive transmission of motion and automatically engages the disk which is rotated farthest from the datum position, being cammed into such engagement and held in such engagement by the other side.

As previously stated, in order for the propeller control ring 63 to move into its feather position, the latch wheel 152 must be rotated to permit maximum movement of the ring 63. This is accomplished by the flexible cable connection 59, the end portion 169 of which enters the coordinating control at the rear thereof (Figs. 1, 3 and 6). This cable is actuated directly by the feather input shaft 239 by mechanism shown particularly in Figs. 5 and 6. A driving wheel 320 for the "Teleflex" cable is splined on the shaft 239. Rotation of the wheel 320 reciprocates the initial driving portion 321 of the flexible cable, which slides in a tubular housing 322. Ears 323 extending from the housing 322 are bored to receive the shaft 239 rotatably so that the fitting 322 is thus supported by the shaft.

The outer end of the housing 322 is slidably received in a bore 324 extending through the wall of the housing 230. An O-ring seal 326 prevents escape of lubricating oil at this point. The outer end of the housing 322 is threaded to receive a nut 327, which is a standard commercial fitting, to couple the external run of flexible cable enclosing conduit to the actuating portion 321 and its housing 322. A joint in the flexible cable is indicated at 328.

The operation of the feather shaft 239 in the control system of this invention also actuates certain electrical controls which may, for example, cut off the fuel supply to the power units and declutch the same from the propeller. The function of these controls will be explained subsequently. For the present, however, it may be noted that the actuation of such controls is effected by switches S2 and S6 (Figs. 5 and 22) which may be of a known commercial single pole double throw type, the contacts of which are actuated by plungers 332 depressed by cams 333 and 334 on a spool-like body keyed to the shaft 239. These switches may be mounted by machine screws 336 extending through transverse openings in the switch case into the web 233 of the case, which screws may also extend through a metal plate 337 fixed to a rib on the case 230 by machine screws 338. Electrical connections from the switches S2 and S6 may be run to a standard electrical cable connector 340 (Figs. 6 and 7) fixed to the housing of the coordinating control to which an electrical conduit 341 may be connected.

The angular movement of the feather input shaft 239 may be limited by a stop pin 342 (Figs. 5 and 8) pressed into the web 233 of the casing which engages shoulders at the ends of a slot or notch 343 milled in the outer face of the disk 270.

In order to align the control gear, means are provided for locking the cam 251 in a known position. As illustrated in Figs. 3, 5, 8, and 9, the cam 251 is formed with a notch 346 in its periphery in which a slidable detent plug 347 may engage. This plug is mounted in a socket in the frame of the housing 230 and is urged toward the cam by a compression spring 348. Normally, the detent 347 is held down in its socket clear of the cam 251 by a pin 349 which clears the margin of the cam and is integral with a hexagon threaded plug 351 which extends through a cover 234 of the coordinating control. By removing the plug 351 and rotating the cam 251 until the pin 347 lodges in the notch 346, the cam 251 is held in this datum position for alignment of the controls.

The coordinating control is partly filled with oil for lubrication. Referring to Fig. 8, tapped bosses 352 and 353 are provided in the top and bottom of the case. A drain plug 354 is fitted in the lower boss 353. An oil filler pipe 356 is screwed into the upper boss 352. A wad of fibrous material 357 to prevent entry of dirt is mounted in the upper end of the filler tube. A cap 358 which is preferably provided with a breather opening (not shown) closes the filler tube. The filler tube and oil drain plug may be interchanged for installations in which it is desired to invert the coordinating control from the orientation shown in Fig. 8.

*Electrical control system*

The electrical control circuits are shown in Fig. 22 and certain of the control instrumentalities are shown in a schematic manner in Fig. 23. In will be understood that minor parts of an engine control system which are immaterial to an understanding of the invention are omitted. It should also be understood that the elements shown in Fig. 23 are represented in a schematic fashion and are not to be considered as showing the actual preferred structure of instrumentalities such as valves, speed-responsive devices, clutches, and the like. Fig. 23 shows only one power unit. In Fig. 22, in the main, circuits which are duplicated for the two power units are shown for one only and details of such devices as amplifiers, the propeller governor, and the like, which are immaterial to an understanding of the invention, have been omitted; all this with a view to eliminating needless complexity and length of the specification. The circuits illustrated in Fig. 22 include those by which the power units are started, the fuel is cut on or off, and the engines are clutched to the propeller, and the electrical circuits of the propeller so far as they are necessary to an understanding of the invention.

The control circuits are principally energized from a D. C. supply 400 by way of a nacelle master bus 401 energized through a switch 402 closed preparatory to any operation of the power plant. A pilot operated run-stop switch S1 or S1' is provided for each power unit. These switches, which are energized from the nacelle bus 401, are closed to stop the respective power unit and to prevent it from operating. When the switch is opened, the power unit is conditioned for operation. Switch S1 energizes a stop relay RS through a lead 403 and, similarly, the stop switch S1' energizes the stop relay RS' of the second unit through a lead 403'.

The stop relays are also energizable through front contacts of a feather relay RF which is energized whenever the propeller is feathered and the electrical system is energized, so that if the propeller is feathered the power units cannot be started and, as will be seen, the power units are cut out of operation if the propeller is feathered with the power plant in operation. The feather relay RF is energized from the nacelle bus 401 through switch S2 in the coordinating control which is coupled to the pilot's feather lever and is closed on contact 404 as illustrated when the lever is in the feather position. The feather relay RF is energized from contact 404 through line 405. With the feather relay energized, its front contacts RF1 and RF2 energize the leads 403 and 403' respectively from the nacelle bus and thereby energize both stop relays RS and RS'. Under these conditions the power units are prevented from operating; thus, for either relay RS or RS' to be deenergized, the stop switch S1 must be in open position and the feather relay must be deenergized.

Starter controls

The feather relay through its back contacts RF3 controls a starting circuit which runs from the nacelle bus 401 through contacts RF3, a normally open pilot-operated start switch S3, and a starter actuating coil 406 to ground. The coil 406 may actuate a valve to supply compressed air to an air starter motor or be a relay coil controlling the energization of an electrical starter, or may fire a cartridge type starter, and so forth. The particular nature of the starter is immaterial.

The system preferably provides for starting of either power unit by a single starter, which may be coupled by solenoid actuated clutches to either power unit. Such an arrangement of a starter or starter selector, which may be coupled to two power units, was described more fully in the copending application of Victor W. Peterson et al., Serial No. 174,052, filed July 15, 1950 (Patent No. 2,838,913 referred to above). The details thereof are immaterial to an understanding of this invention, but the arrangement is illustrated schematically in Fig. 23.

The power output shaft 410 of the A unit is coupled by intermediate gearing 411 to a gear 412 freely rotatable on a shaft 413 driven by the starter motor 414. A second gear 416 rotatable on shaft 413 is connected by gearing 417 to the B power unit (not shown). A collar 418 splined to shaft 413 is provided with dog clutch parts at each end engageable with mating clutch parts on the gears 412 and 416. A reciprocable shifter member 419 is coupled by a fork 421 to the collar 418. Solenoids 422 and 422' cause engagement of either clutch. The clutches may be biased to open if the solenoids are deenergized. The motor 414 may be energized by compressed air from any suitable source under control of a valve 423 opened by the starter actuating coil 406.

The starter motor is coupled to the A unit by energization of solenoid 422 or to the B unit by energization of solenoid 422'. One or the other of the solenoids is energized concurrently with the energization of the starting solenoid 406. In order to start one unit, the run-stop switch S1 of that unit is left open and that of the other unit is left closed or, in other words, in the stop position. Assuming that the A unit stop solenoid RS is deenergized, a circuit is made from the start switch S3 through a line 426, back contacts RS1 of the stop relay, and selector coil 422 to ground. If the B unit were to be started first, switch S1 would be closed and switch S1' left open, in which case the solenoid coil 422' would be similarly energized through line 426' and back contacts RS1' of the B unit stop relay.

It will be seen from the foregoing that by moving the stop switch of either unit to the run position, and the feather control to the unfeather position, then closing the start switch S3, the starter is energized and is coupled to one of the power units to accelerate it to starting speed.

Fuel system and ignition controls

In order to start the engine of a unit, it is also necessary to supply fuel and to ignite the fuel.

The ignition system of the A unit, which may be of conventional type, is indicated by the symbol 430 and is energized from a 400 cycle A. C. bus 431 through line 432, back contacts RI1 of the ignition relay RI, and lead 433. The ignition relay is energized to cut out the ignition circuit after the flame has been started in the engine under control of a temperature relay TR. This relay responds to the temperature in the engine which is sensed by thermocouples 435. The thermocouple response is amplified by an electronic amplifier 436 energized from the A. C. bus 431. The output of the amplifier energizes the relay TR whenever the temperature in the engine indicates that normal combustion has been established. When the starting cycle is initiated, the thermocouple relay TR is deenergized, but the ignition relay RI is energized at this time by a circuit from the nacelle bus 401 through the normally closed contact 438 of an engine speed responsive switch S4, lines 439 and 440, back contacts of relay TR, and line 441. The ignition circuit is thus deenergized. When the engine is cranked to a suitable speed to start combustion, which speed may be something like 15 percent of rated engine R. P. M., the speed switch S4 opens the circuit through contact 438, deenergizing the ignition relay and energizing the ignition system.

The speed switch arm S4 is illustrated in Fig. 23 as actuated by a conventional flyball type speed-responsive device 443 driven off the main shaft 410 of the engine through an auxiliary drive gearing system including gears 444, shaft 446, and gear 447. The operation of centrifugal switches is generally understood. The contact arm S4 is energized from the nacelle bus and remains in engagement with contact 438 until the engine reaches the speed for which the switch is set, when contact arm S4 engages contact 448.

For convenient reference, the principal parts of the fuel system of the engine are shown diagrammatically in Fig. 23.

Fuel is led from the source through a conduit 451 to the fuel pump 39, which is driven off the auxiliary drive shaft 446. The pump discharges the fuel through a line 452 into the fuel control device 40, the principal parts of which are a power control throttle valve 453, a by-pass valve 454, and a variable overspeed governor valve 455. The throttle valve and governor valve are in series. The by-pass valve 454 serves to maintain a definite pressure drop across the fuel control valves 453 and 455 so that the quantity of fuel supplied the engine is directly determined by the valves 453 and 455 and is not affected by variations in supply pressure or pressure within the combustion chambers. The valve 453 may comprise a plunger 457 slidable within the body of the valve, so that it may variably obstruct the inlet and outlet ports 458 and 459 of the valve, or one of them. The plunger 457 is shown schematically as actuated by a stem 461 moved by cam 462 which corresponds essentially to the cam slot 252 of the cam disk 251 of the coordinating control. The fuel, after passing through the throttle valve 453, enters a chamber 463 of the governor valve within which a sleeve 464 is slidably mounted. Sleeve 464 is actuated through a stem 465 by a speed-responsive device indicated by the conventional flyball device 466 driven off the shaft 446. A plunger 467 slidable within the sleeve 464 acts to obstruct inlet and outlet ports 468 and 469 in the sleeve 464. The port 468 is supplied from chamber 463 and the port 469 discharges into a chamber 471 which communicates with the fuel discharge line 472 of the fuel regulator. The position of the sleeve 464 is determined by the shaft speed of the engine. The position of the plunger 467 is determined by a cam 473 acting on a stem 474 connected to the plunger. Cam 473 corresponds to cam slot 253 of cam 251 in the coordinating control. As will be apparent, the effective area of the throttling passages in the valve 455 is determined by the relative position of the two members 464 and 467. By virtue of the cam 473 the governor valve is set for the desired R. P. M. If the R. P. M. exceeds the desired amount, the speed-responsive device 466 will move the sleeve 464 to throttle the fuel flow.

The by-pass valve 454 is connected to the discharge line by conduit 476 through which a pressure corresponding to the output pressure of the fuel regulator is fed into the body of the valve below a sliding piston 477. The piston 477 is also urged upwardly by compression spring 478. Pump discharge fuel is fed into the upper end of the valve body 454 and urges the piston 477 downwardly against the forces due to the regulated output pressure and the spring 478. The piston 477 throttles an outlet port 479 of the by-pass valve which is connected through conduit 481 to the pump inlet. The by-pass valve thus balances the force of spring 478 against the resultant force due to the inlet and outlet pressures of the fuel regulator. If this pressure differential increases, the plunger will move downward to allow more fuel to escape back to the pump inlet through the port 479.

It will be understood that a complete fuel regulator for an aircraft gas turbine engine will ordinarily include, in addition to the elements described above, arrangements for compensating for variations in temperature and pressure in inlet air and a temperature-responsive valve to limit the temperature in the engine regardless of the operation of the other valves. It will also be understood that the physical embodiment may be greatly different from the schematic representation presented here.

Since the valves 453 and 455 are operated by cams driven by the same shaft, and since this shaft is also coupled to the propeller control, the throttle or power control valve 453, the governor valve 455, and the propeller controls are coordinated.

The nature of the coordination may be similar or identical to that described in the above-mentioned co-pending application Serial No. 194,716 (Patent No. 2,851,113) and need not be explained in detail, since it is not necessary to an understanding of the invention. It may be pointed out, however, that in normal operation the propeller speed governor determines engine speed and the throttle valve 453 determines power. The governor valve 455 is set to a high enough speed that it is inoperative under these conditions, unless the propeller governor fails, when it may act as a safety governor. When the propeller pitch is set directly (blade angle control), the speed governor is set by the cam 473 to appropriate values of engine R. P. M. for the particular propeller condition.

As illustrated schematically, the cams 462 and 473 are mounted on a shaft 482 which corresponds to the shaft 244 of the coordinating control. This shaft, as previously described, is coupled by arm 44 and link 46 (and whatever further mechanism is appropriate) to the pilot's power control lever 45 by which the propeller and the power units are controlled.

The fuel system also includes a shut-off valve 484 in the outlet conduit 472 of the fuel regulator. This may be a cut-off valve of any suitable type, illustrated as one comprising a rotary plug 486 mounted in the body with a transverse passage 487 which may connect the inlet and outlet of the valve.

From the shut-off valve 484 the fuel is conducted through a line 488 to a drip valve 489 and from the drip valve through line 491 to the combustion section 34 of the engine.

The drip valve 489 is provided to drain fuel from the engine after a false start. As shown schematically, this valve comprises a chamber 492 through which the fuel flows to the engine, from which there is a drain outlet 493. The drain is closed by a valve poppet 494 when the poppet is seated. In the absence of pressure in the system, the poppet is held off its seat by compression spring 496. A solenoid 497 acting upon the stem of the valve can be energized to seat the valve to prevent escape of fluid. As soon as normal fuel flow is established, the pressure drop across the fuel nozzles in the combustion system is sufficient to hold the valve seated and the solenoid then may be deenergized.

Concurrently with the energization of the ignition system, the drip valve solenoid 497 is energized from bus 401 through line 498 and back contacts RI2 of the ignition relay to close the drip valve.

When the speed switch S4 breaks the contact 438, it also closes the contact 448 to open the shut-off valve 484 in the fuel system to permit fuel to flow to the burners of the engine. This valve is operated by an actuator motor 500 comprising an armature 501, a field coil 502 which drives the motor in the direction to open the valve, and a field coil 503 which operates the motor in the opposite direction. The armature is coupled to limit switches 504 and 506 in the circuits through the respective fields which are individually in series relation to the armature. The motor may be geared to the valve in a conventional manner.

When the speed switch S4 closes on contact 448 at about 15 per cent rated speed, a circuit is made from the nacelle bus through contact 448, line 507, back contacts RS2 of the stop relay, line 508, limit switch 504, field coil 502, and armature 501, to operate the motor 500 to open the valve, limit switch 504 breaking the circuit when the valve is open. With the throttle set at a suitable point to provide a desired flow of fuel to the engine for starting purposes, the starter energized, the fuel shut-off valve open, and the ignition energized, flame will be started in the combustion apparatus of the engine and the engine will continue to accelerate with the assistance of the starter motor. When the flame is established, the thermocouple 435 will detect this condition and energize the temperature relay TR to break the ignition circuit. The pilot or engineer continues to hold the starter switch S3 closed until a tachometer indicates that the power unit has reached a speed at which it is self-sustaining, whereupon switch S3 is released to deenergize the starter and starter selector solenoid.

The power unit thus brought into operation may be clutched to the propeller by the pilot.

Clutch controls

The clutch for each unit may be of the type disclosed in the co-pending application of Peterson et al., Serial No. 174,052, filed July 15, 1950 (Patent No. 2,838,913). That clutch is a friction clutch including a hydraulic cylinder to which fluid is supplied under pressure by a valve for engaging and disengaging the clutch. Additional fluid is supplied during the period of engagement of the clutch for cooling the plates under control of a second valve. These two valves are operated by a common actuator. As disclosed in that application, the valves are operated by a common manual actuator or lever. This actuator is in one extreme position for disengagement of the clutches, is moved to the other extreme position to engage the clutch and supply cooling oil thereto, and is returned to an intermediate position to hold the clutch engaged and terminate the supply of cooling oil.

In the system disclosed herein, the valves of the clutch system are operated by an electrical actuator motor, the control of which is a feature of this invention. For convenient reference, the clutch and control valves are shown diagrammatically in Fig. 23, the valves illustrated schematically corresponding functionally to the valves of the above-mentioned application Serial No. 174,052.

There is a clutch for each power unit located in the reduction gear case. A shaft 510, which is driven by the engine power output shaft 410, is coupled by the clutch 511 to a shaft 512 which is directly connected through the reduction gearing to the propeller shafts. The clutch is illustrated schematically and comprises interleaved plates 513, alternate ones of which are splined to the shaft 510 and to a housing 514 rotatable with the output shaft 512. A piston 516 is fixed on the shaft 510 and a hydraulic cylinder 517 within which the piston is contained is axially slidable on the shaft 510. By admitting oil under pressure to the chambers on either side of the piston, the cylinder may be moved to compress the plates together and engage the clutch, or moved in the other direction to release the clutch. The hydraulic fluid for operating and cooling the clutch is supplied by a pump 518 which is indicated schematically as driven off the auxiliary shaft 446, although it may be driven otherwise. This fluid is discharged through line 519 to an engagement control valve 521 illustrated as being of the rotary plug type. The valve has an extended inlet port 522, an extended outlet port 523 from which oil is discharged to engage the clutch, and an outlet port 524 through which oil is discharged to release the clutch. The valve plug 526 is formed with a transverse passage which is extended circumferentially at the end which communicates with the inlet chamber 522. Valve 521 is shown in the clutch disengaging position in which oil is fed from line 519 through port 522, plug 526, port 524, line 527, and a passage 528 in the shaft 510 to move the cylinder 517 to the right. As the valve is rotated counterclockwise it supplies oil to line 529 which communicates through a passage 531 in the shaft with the clutch applying chamber. Because of the circumferential extent of chamber 523, fluid is supplied to engage the clutch or hold it engaged in either an intermediate position of the plug or a position corresponding to further rotation counterclockwise.

The plug 526 of valve 521 is mechanically coupled to the movable valve member or plug 533 of a cooling oil control valve 534, also supplied from the pump 518 through the line 519. When the valves are either in the position shown or the intermediate position, the valve 534 is closed. When the valves are rotated counterclockwise to the extreme position, the plug 533 connects the line 519 to a line 536 which supplies cooling oil to the clutch plates through a passage 537 in the shaft 510. Thus, in the position shown, oil under pressure is supplied only to release the clutch. In the intermediate position, oil under pressure is supplied only to hold the clutch engaged. In the extreme position, oil is supplied under pressure to engage the clutch and to cool the clutch.

The valves 521 and 534 are operated by a reversible electrical actuator motor 538. Referring to Fig. 22, the actuator motor 538 comprises an armature 539 and a brake coil 450 in series. Two field windings 541 and 542, which drive the motor in opposite directions, are arranged in parallel so that energization current may be fed in series through either field coil, the brake coil, and the armature. Actuator motors of this type are commercially available and need not be further described. The actuator motor also comprises a limit switch apparatus to stop the motor in either of its extreme positions or the intermediate position comprising limit switches 543, 544, and 545 driven by the armature 539.

Clutch actuation is controlled by the pilot-operated two pole three position switch S5. With the switch S5 in the "Disengage" position as illustrated, current is supplied from the nacelle bus 401 through switch contact 546, line 547, limit switch arm 545, contact 545a, line 548, coils 542 and 540, and armature 539, to drive the actuator motor to the position in which the clutch control valve is in the disengage position and the cooling oil is shut off. When the actuator reaches its limit of travel, contact 545a is opened and arm 545 closes on contact 545b, thus energizing, from line 547 through line 549 an indicator light 550 which signals to the pilot that the clutch is disengaged.

When the power unit is in operation, the switch S5 is moved by the pilot to its other extreme position to energize contact 551 from the nacelle bus. From contact 551 the actuator is energized to engage and cool the clutch through line 552, back contacts RS3 of the stop relay, line 553, limit switch arm 543, contact 543a, coils 541 and 540, and armature 539. The actuator motor thus runs to its other extreme position, whereupon contact 543a is opened to stop the motor and the arm 543 closes on contact 543b, energizing a signal light 554 through line 555. This light indicates to the pilot that the clutch is engaged and the cooling oil is being supplied.

When the propeller has been brought up to speed by the power unit, this condition is evident to the pilot, who then moves the switch S5 to its intermediate or holding position to cut off the cooling oil and maintain the clutch engaged.

Switch S5 then in this position closes a circuit from the nacelle bus through contact 556, line 557, contact 544a of the limit switch 544, line 548, coils 542 and 540, and armature 539, to drive the motor back toward its initial position. At an intermediate position of the actuator at which the cooling oil valve is closed but the supply of oil under pressure to hold the clutch engaged is maintained, the limit switch 544 opens the circuit through contact 544a, stopping the motor, and makes a circuit through contact 544b and line 558 to the "clutch engaged, cooling oil off" signal light 559. As will be understood, the brake coil 540 holds a brake on the actuator released in known manner so that, when the energizing circuit for the motor is broken, the brake is applied to prevent coasting of the actuator motor. As will be apparent, this relatively simple system gives the pilot full control of the engagement of the clutches and presents him at all times with information as to the status of the clutch control and valves.

Engine controls

The ignition, fuel, and clutch circuits of the second or B unit are not shown in detail to avoid unnecessary complexity of the diagram, since they duplicate those of the A unit. These circuits are indicated by the block 560 in Fig. 22, and are energized from the nacelle bus 401 and from the 400 cycle bus 431. When the first unit is operating and clutched to the propeller, the second unit may be started. While the starter may be used to start either unit, once one unit is operating it is most convenient to start the second unit by clutching it to the propeller and thereby to the operating unit, which furnishes power to crank the second unit to operating speed.

Therefore, to start the second unit, its stop switch is moved to the run (open) position, deenergizing the stop relay and setting up the ignition and fuel control circuits as previously described. The clutch switch of the second unit is then moved to the "Engage" position, whereupon the second unit is cranked by the first. When the speed reaches the appropriate value, as previously explained, the fuel valve 484 is opened. The ignition is cut off by the temperature responsive relay when the flame is ignited.

When the second unit is at full speed, which can be determined by a tachometer, the clutch switch is moved to the holding position to cut off the supply of coolant. Since the circuits are identical, either unit may be started first, or, if desired, one unit can be started or run with the other remaining idle.

In normal operation of the power plant, one or both of the units may be in operation. For take-off or high power ratings both units will be operated. However, for cruising power ratings or in the event of malfunctioning of one power unit, this unit may be taken out of operation and the remaining unit may continue to drive the propeller. In order to cut out one of the two units, it is only necessary to close the stop switch S1 of that unit. Supposing, for instance, that the A unit is to be cut out; when switch S1 is closed, it energizes the stop relay RS from the nacelle but through line 403. When RS is energized, it opens its back contacts RS1, RS2, and RS3 which disable respectively the starter selector circuit, the fuel valve opening circuit, and the clutch engaging circuit of that unit. The energized stop relay also completes a circuit from the nacelle bus through line 498, its front contacts RS4, lines 439, 440, and 571, limit switch 506, field coil 503, and armature 501 of the fuel valve actuator motor to operate the motor to close the valve in the fuel line to the unit. This circuit is opened by the limit switch 506 when the valve is closed. The stop relay also completes a circuit from line 498 through its front contacts RS5 to line 547 which, as previously described, operates the clutch actuator motor 538 to disengage the power unit clutch. The ignition relay is held energized through line 498, contacts RS4, line 439, line 440, the back contacts of temperature relay TR, and line 441, to maintain the ignition device 430 deenergized when the unit cools off.

If the pilot should desire to cut out both units without feathering the propellers, both of the stop switches S1 and S1' are closed. Ordinarily, however, to cut the entire power plant out of operation the propeller would be feathered. When the pilot operates his control to feather the propeller, the switch S2 is closed, which energizes relay RF from the nacelle bus through line 405. Relay RF energizes both stop relays through its front contacts RF1 and RF2 and lines 403 and 403' respectively, thus shutting off the fuel supply to both units and declutching both from the propeller.

*Propeller control*

The control system of this invention is intended to operate with a propeller having a control system of the same nature as that generally described in the previously mentioned copending application Serial No. 194,716. The propeller control is greatly simplified, however. The direct mechanical control of the propeller by a single power control lever and a manual feather control eliminates many of the complexities of the system described in Serial No. 194,716. In addition, the system described herein preferably eliminates the provision for variation of propeller governor speed setting, although such may be provided.

As previously stated, this propeller is of the type which may be set to desired values of pitch or may be set for automatic pitch control to maintain the desired engine speed. The range of fixed pitch setting or blade angle control setting may include a negative pitch range for reverse thrust. The propeller is normally feathered when the engine is out of operation, and is set to a zero blade angle or minimum thrust position when starting the power units. The propeller control is effected by movement of the control ring 63, which establishes the blade angle setting of the follow-up system of the propeller, establishes the speed governor in automatic control of the propeller pitch, or causes feathering or unfeathering.

In view of the great complexity of the propeller as such and the fact that the principles of the invention may be exploited with propellers of various construction, it is deemed unnecessary in general to enter into the details of the propeller. However, some features of the preferred propeller will be outlined briefly as an aid to understanding the invention.

The particular propeller to which the description in this specification relates is one in which the pitch of the propeller blades is changed by hydraulic motors normally energized through an appropriate control valve system from a pump driven by the rotation of the propeller. However, in order to provide power for unfeathering the propeller or for feathering it when the propeller is not rotating, a pump driven by an electric motor in the propeller is provided. This motor 600 which is referred to as the feather pump motor, is a three-phase motor energized from a three-phase power bus 601, 602, 603 through slip rings in the propeller assembly. Power is conducted from the three-phase power bus to the motor 600 through the front contacts RT1, RT2, and RT3 of a propeller transfer relay RT. Contacts RT3 are connected to one terminal of the three-phase motor through a line 604. Front contact RT2 is connected to a second terminal of the motor through a switch arm S7a of a centrifugal switch S7 responsive to rotation of the propeller and a line 606. Front contacts RT1 are coupled to the third terminal of the motor through switch arm S7b of switch S7 and line 607. Motor 600 is energized when switch S7 is in the position shown, which is the case when the propeller speed is below a relatively low value. When the propeller is operating in its normal speed range, the centrifugal switch S7 opens the circuit to the motor 600 and closes on its front contacts for a purpose to be described.

Assuming that the propeller is feathered and the pilot desires to unfeather, he actuates his feather lever and through the mechanical linkage previously described rotates the propeller control ring 63 to set up the propeller control system to unfeather the propeller. In this position, switch S6 actuated by the feather lever closes on contact 609 to complete a circuit from the nacelle bus through switch arm S6, contact 609, line 611, back contacts RL1 of a latching relay RL, and line 612 to energize the transfer relay RT. Energy is thus supplied to the feather pump motor 500 as previously described, and the pump supplies hydraulic fluid to the propeller mechanism to unfeather the propeller. The heating coil 613 of a normally open bimetallic time delay relay RD is also energized from line 612. The bimetal contact arm of relay RD is connected to contact 609 by a line 614. After a time delay sufficient to effect unfeathering of the propeller, the heating coil closes the contact of relay RD, which completes a circuit through switch S6, contact 609, line 614, relay RD, line 615, and the coil of latching relay RL to ground. Relay RL thus opens its back contacts RL1 and deenergizes the transfer relay RT. The latching relay is provided with means to hold the relay open, which may comprise a dog 616 on the armature of the relay cooperating with a latch 617 which may be withdrawn by a solenoid 618. Until the coil 618 is energized, contacts RL1 are held open by the latch arrangement 616, 617. This condition persists until the pilot desires to feather the propeller, when operation of the feather control moves switch S6 to the position illustrated in the drawing, at which time the lines 611 and 614 are again energized through contact 619 of the switch S6. In moving from contact 609 to contact 619, the switch arm S6 engages contact 621, which energizes the latch release coil 618 from the nacelle bus through line 622, so that the contacts RL1 are permitted to close. This again energizes the transfer relay as previously described, and it will remain energized until the delay relay RD operates. Concurrently with the actuation of the switch S6 to contact point 619, the mechanical connection from the pilot's feather lever disables the safety latch on the control ring 63 and rotates this control ring to the feather position.

As the propeller is rotating, the propeller driven pump will operate to feather the propeller. If the propeller rotation falls below the predetermined value, the centrifugal switch S7 closes to energize the feathering pump motor 600 to furnish power to complete the feathering cycle.

It may be noted that in practice contacts 609 and 619 of switch S6 are the same contact, the arm being oscillated by the cam 334 (Fig. 5).

As previously stated, the transfer relay RT is energized only for a predetermined time interval during the unfeathering or feathering operation. When deenergized, this relay closes its back contacts RT1 and RT2 which are instrumental in setting up the circuits by which the propeller governor 630 transmits signals to the regulating valve by which propeller pitch is adjusted to maintain the desired propeller speed. The propeller governor 630 is normally energized over a line 631 from the 400 cycle A. C. bus 431. By means which are immaterial to the present invention, it compares actual propeller speed with the desired speed and transmits pitch control signals to the propeller to correct the pitch setting to bring the speed to the desired value. These control signals are transmitted over lines 632 and 633, through the back contacts RG1 and RG2 of a governor disconnect relay RG, and lines 634 and 636 to the back contacts RT1 and RT2 of the transfer relay RT, so that, with the relays RG and RT deenergized, the speed governing signals are transmitted to the arms S7a and S7b of the propeller centrifugal switch S7. When this switch is closed on its front contacts under the influence of centrifugal force during normal rotation of the propeller, lines 634 and 636 are connected to lines 637 and 638 extending to control solenoids 639, 640, respectively, of the speed control valve of the propeller.

In the specific propeller under discussion the solenoids operate a valve which is movable in either direction to increase or decrease the propeller pitch. Obviously, the coil 639 and 640 could be field coils of a reversible motor to control propeller pitch, or could actuate clutches or other instrumentalities for varying the pitch in response to the governor signals.

The governor disconnect relay RG is provided to disable the governor when the propeller is in blade angle control in which the pitch of the blades is directly responsive to the position of the control ring 63 and when the propeller is feathered. This relay may be energized from the nacelle bus 401 through a single-pole double-throw switch S8 (Figs. 22 and 23) which is actuated by the cam 650 or equivalent mechanism which forms a part of the pilot's control lever assembly and is directly operated by the power control lever 45. When the lever 45 is in its range of movement corresponding to direct blade angle control, the arm of switch S8 connects the nacelle bus through line 651 to relay RG, the back contacts of which break the pitch control circuit between the propeller governor 630 and the power control coils 639 and 640. When the power control lever is moved into the range for speed governing propeller operation, the cam 650 throws the switch S8 to its other contact which is connected to line 405. Line 405 is energized from the nacelle bus only when the controls are actuated to feather the propeller. In this condition, a circuit is made from the nacelle bus through switch S2, line 405, switch S8, and line 651, to energize the governor disconnect relay RG. Thus, in normal operation, the governor disconnect relay is connected to line 405 which is deenergized but which is energized as soon as feathering is initiated. If the pilot returns the power control to the blade angle range, the governor disconnect relay is energized as previously described.

Figs. 27 and 28 illustrate two schedules for the pilot's power control lever 46. That of Fig. 27 is for a power plant in which reverse pitch operation of the propeller is provided, and that of Fig. 28 is for an installation in which reverse pitch is not used. Referring first to Fig. 27, the control lever 45 swings in an arc through a gate or slot 660 indicated schematically. Approximately one third of the quadrant is the taxi range or blade angle control range in which blade angle is varied from a maximum negative pitch value to a positive pitch value with blade angle directly responsive to the position of the lever 45. Near the middle of this range is the start position in which the engine is started and at which the propeller is at a zero thrust pitch value. The remainder of the quadrant is the flight range in which the propeller pitch is controlled by the propeller governor. The engine power is varied from a minimum value at operational idle to a maximum value at the maximum power position. The operational idle setting may be employed for idling on the ground or for landing. The gate 660 is provided with offsets as illustrated to prevent inadvertent movement of the power control lever from the flight range into the taxi range or from the positive thrust part of the taxi range into the reverse thrust part of this range.

The setup in Fig. 28 is similar to that in Fig. 27 except that there is no negative thrust portion of the blade angle control or taxi range and the left-hand end of the slot 661 corresponds to a stop position in which the engine throttle is closed.

In the taxi range, the throttle valve is actuated so that it follows such a schedule in relation to the power requirements of the propeller that one power unit is capable of handling the propeller load. When both power units are in operation, an excess of power is available, but engine speed is limited by the governors in the fuel controls which are scheduled in accordance with the desired values of engine R. P. M. for each value of blade angle.

In the flight range, the power control throttle valve is varied from its position giving minimum power output to that of maximum output, and the propeller is automatically regulated to absorb the amount of power generated by the power units, or by one unit if only one is in operation. Through this range the setting of the governor in the fuel control is kept above the propeller governor setting so that the fuel control governor is merely a standby or safety device.

Résumé of operation

Since the operation of the various parts of the system and the relation of these functions to each other have been described at some length, it is believed that a full treatment of the operation would be superfluous. However, a résumé of the operation may be desirable.

Assuming that the power plant is out of operation and the propeller feathered, the following steps may be taken to start up the power plant: The power supply buses are energized and the propeller unfeathered. The power control lever of either unit is then moved to the start position and the stop switch of that unit is opened. The starter button is then held closed, bringing the automatic starting cycle, previously described, into action, and is held closed until the unit reaches a self-sustaining speed.

With the unit in operation, the clutch control switch of that unit is actuated to supply fluid for engaging and cooling the clutch during the cooling engagement. When the propeller has been brought up to speed, the switch is moved to its intermediate position, thus cutting off the cooling oil.

The second power section may then be started by moving the stop switch to the open position and operating the clutch control switch for that unit in the same manner as for the first unit.

The aircraft may then be taxied by moving the power control lever forward in the taxiing range, or the flight range may be used for taxiing by moving the control to operational idle or beyond. The power output of the engine is but little different in operational idle from that in start, but in the operational idle position the propeller governor is in operation and the propeller is not held at the zero pitch position. Where reverse thrust is provided as illustrated in Fig. 27, this reverse thrust may be employed for ground or water movement of the aircraft, if desired. For take-off, the power control is moved to the maximum power position from which it may be throttled back after completion of take-off. The engine output may be reduced by moving the power control lever to an intermediate position in the flight range. However, for most economical operation at reduced power, it is preferable to cut out one power unit, which may be accomplished by closing the stop switch of that unit. If the entire power plant is to be cut out, this is automatically accomplished by operating the feather control to feather the propeller which, as previously described, shuts down the power units by cutting off the fuel supply to them and declutches them from the propeller.

It will be seen from the foregoing that an especially simple power plant control is provided for the pilot. The single power control lever controls the propeller and both power units. During normal operation, the feather control need only be operated as part of the starting operation or to cut out the power plant. Only the feather control need be operated for this latter purpose. A single switch for each unit makes it possible to take the unit out of operation merely by actuation of this switch. The control of the clutches is also effected by a single three-position switch for each unit.

We claim:

1. An aircraft power plant comprising, in combination, two power units, a propeller driven thereby, a fuel control device for each power unit, means coupling the fuel control devices for concurrent regulation, a coordinating control device driving the said means, a manually operable power control for setting the coordinating control at will, a propeller pitch control means having a propeller feathering position, motion transmitting means coupling the propeller pitch control means to the coordinating control device, a manually operable feather control, and means, actuated by movement of the feather control to feather the propeller, for operating the motion transmitting means to move the pitch control means to feathering position independently of the fuel control devices.

2. An aircraft power plant comprising, in combination, two power units, a propeller driven by the power units, a fuel control device for each power unit, means coupling the fuel control devices for concurrent regulation, a manually operable power control for setting the fuel control devices at will, a propeller pitch control means, motion-transmitting means normally coupling the propeller pitch control means to the power control, a manually operable feather control, and means, actuated by movement of the feather control to feather the propeller, for uncoupling the motion transmitting means from the power control and coupling the motion transmitting means to the feather control.

3. An aircraft power plant comprising, in combination, two power units, a propeller driven by the power units, a fuel control device for each power unit, means coupling the fuel control devices for concurrent regulation, a coordinating control device driving the said means, a manually operable power control for setting the coordinating control at will, a propeller pitch control means, motion-transmitting means normally coupling the propeller pitch control means to the power control, a manually operable feather control, and means, actuated by movement of the feather control to feather the propeller, for uncoupling the motion transmitting means from the power control and coupling the motion transmitting means to the feather control.

4. An aircraft power plant comprising, in combination, a prime mover, a propeller coupled thereto and driven thereby, shiftable means on the propeller for controlling the mode of operation thereof, a control device remote from the propeller, first mechanical motion-transmitting means connecting the said control device and the shiftable means and extending from the control device to the shiftable means, detent means normally limiting the movement of the shiftable means, and a second mechanical motion-transmitting means connecting the said control device and the detent means and extending from the control device to the detent means operated by the said control device to inactivate the detent means when the control device operates to effect movement of the shiftable means beyond the normal limit.

5. An aircraft power plant comprising, in combination, a prime mover, a propeller coupled thereto and driven thereby, shiftable means on the propeller for controlling the mode of operation thereof shiftable to effect feathering of the propeller, a control device remote from the propeller, first mechanical motion-transmitting means connecting the said control device and the shiftable means and extending from the control device to the shiftable means, detent means normally blocking movement of the shiftable means to effect feathering, and a second mechanical motion-transmitting means connecting the said control device and the detent means and extending from the control device to the detent means operated by the control device to inactivate the detent means when the control device operates to effect feathering of the propeller.

6. An aircraft power plant comprising, in combination, a reduction gear assembly, a propeller mounted thereon, and a power unit driving the reduction gear, the power unit being demountably connected to the reduction gear assembly; shiftable control means on the propeller; a control device mounted on the power unit; and a motion-transmitting coupling between the control device and the propeller control means comprising a first motion-transmitting means on the reduction gear assembly, a second motion-transmitting means on the power unit, and a third motion-transmitting means interconnecting the first and second motion-transmitting means and demountably connected thereto.

7. An aircraft power plant comprising, in combination, a reduction gear assembly, a propeller mounted thereon, and a power unit driving the reduction gear, the power unit being demountably connected to the reduction gear assembly; shiftable control means on the propeller; a control device mounted on the power unit; and a motion-transmitting coupling between the control device and the propeller control means comprising a first motion-transmitting means on the reduction gear assembly, a second motion-transmitting means on the power unit, and a third motion-transmitting means interconnecting the first and second motion-transmitting means and demountably connected thereto; the motion-transmitting coupling including means to reverse the direction of motion to compensate for expansion of the power plant.

8. An aircraft power plant comprising, in combination, a reduction gear assembly, a propeller mounted thereon, and a power unit driving the reduction gear; shiftable control means on the propeller; a control device mounted on the power unit; and a motion-transmitting coupling between the control device and the propeller control means comprising a first motion-transmitting means on the reduction gear assembly, a second motion-transmitting means on the power unit, and a third motion-transmitting means interconnecting the first and second motion-transmitting means; the motion-transmitting coupling including means to reverse the direction of motion to compensate for expansion of the power plant.

9. An aircraft power plant comprising, in combination, a power unit, a reduction gear coupled thereto, a propeller mounted on the reduction gear, a shiftable control means on the propeller, a lever at the propeller end of the reduction gear, a link connecting the control means to the lever, a motion reversing device mounted on the power unit adjacent the end thereof closer to the reduction gear, a link connecting the lever to the motion reversing device, a control device mounted on the power unit, and a link connecting the motion reversing device to the control device, the control device being remote from the motion reversing device.

10. An aircraft power plant comprising, in combination, a prime mover, a propeller mounted on the prime mover, a shiftable control means on the propeller, a lever on the prime mover adjacent the propeller, a link connecting the control means to the lever, a rocker arm device with generally oppositely-directed arms mounted on the prime mover, a link connecting the lever to one arm of the rocker arm device, a control device mounted on the prime mover, and a link connecting the other arm of the rocker arm device to the control device.

11. An aircraft power plant comprising, in combination, a power unit, a reduction gear coupled thereto, a propeller mounted on the reduction gear, a shiftable control ring on the propeller, a first lever at the propeller end of the reduction gear, a link connecting the control ring to the first lever, a second lever on the reduction gear, a second link connecting the first lever to the second lever, a rocker arm device with generally oppositely-directed arms mounted on the power unit, a third link connecting the second lever to one arm of the rocker arm device, a control device mounted on the power unit, and a fourth link connecting the other arm of the rocker arm device to the control device.

12. An aircraft power plant comprising, in combination, a power unit, a reduction gear coupled thereto, a propeller mounted on the reduction gear, a shiftable control ring on the propeller, a first lever at the propeller end of the reduction gear, a link connecting the control ring to the first lever, a second lever on the reduction gear, a second link connecting the first lever to the second lever, a rocker arm device with generally oppositely-directed arms mounted on the power unit, a third link connecting the second lever to one arm of the rocker arm device, a control device mounted on the power unit, a fourth link connecting the other arm of the rocker arm device to the control device, means for adjusting the lengths of the first and third links, and means for fixing the first lever and the rocker arm device in datum position to facilitate the said adjustment.

13. An aircraft power plant comprising, in combination, a power unit, a reduction gear coupled thereto, a propeller mounted on the reduction gear, a shiftable control ring on the propeller, a first lever at the propeller end of the reduction gear, a link connecting the control ring to the first lever, a second lever on the reduction gear, a second link connecting the first lever to the second lever, a rocker arm device with generally oppositely-directed arms mounted on the power unit, a third link connecting the second lever to one arm of the rocker arm device, a control device mounted on the power unit, a fourth link connecting the other arm of the rocker arm device to the control device, means for angularly adjusting the arms of the rocker arm device relative to each other, means for fixing the control device in a datum position, and means for adjusting the length of at least one of the links.

14. In combination, a prime mover subject to expansion in operation, a propeller mounted thereon, a controlling device mounted on the prime mover remote from the propeller, motion-reversing means mounted on the prime mover between the controlling device and the propeller, shiftable control means on the propeller, motion-transmitting means connected between the motion-reversing means and the controlling device, and motion-transmitting means connected between the motion-reversing means and the shiftable control means.

15. In combination, a power plant subject to expansion in service, a controlled device mounted thereon, a controlling device mounted on the power plant remote from the controlled device, and motion-transmitting means interconnecting the devices, the motion-transmitting means including means intermediate the ends thereof for reversing the direction of motion so as to move the controlled device in opposite direction to the controlling device to compensate for expansion of the power plant.

16. In combination, a power plant subject to expansion in service, a controlled device mounted thereon, a controlling device mounted on the power plant remote from the controlled device, and motion-transmitting means interconnecting the devices, the motion-transmitting means including means mounted on the power plant intermediate the ends of the motion-transmitting means for reversing the direction of motion so as to move the controlled device in opposite direction to the controlling device to compensate for expansion of the power plant.

17. An aircraft power plant comprising, in combination, a propeller, control means for the propeller movable to determine the mode of operation of the propeller, a propeller governor, a power unit driving the propeller, power control means for the power unit, a coordinating control coordinately regulating the propeller control means and the power control means, a manually movable control means remote from the coordinating control and coupled thereto for setting the coordinating control, and means for effecting connection of the propeller governor to the propeller through a part of the range of movement of the manually movable control means comprising a switch on the manually movable control means.

18. A power plant comprising, in combination, two power units, a power output means driven by the power units, means for clutching each power unit to the power output means, a fuel supply control for each unit, a master control for coordinately regulating the fuel supply controls of the two units, an overriding cutout control for each unit actuatable for shutting off the fuel supply thereto and declutching the unit from the power output means, a starter, means for coupling the starter to either of the power units, and means responsive to the cutout control of either unit for actuating the coupling means to couple the starter to that unit when the cutout control is not actuated.

19. In combination, a prime mover subject to expansion in operation, a propeller mounted thereon, a controlling device mounted on the prime mover remote from the propeller, motion-reversing means comprising a lever of the first class fulcrumed on the prime mover between the controlling device and the propeller, shiftable control means on the propeller, motion-transmitting link means connected between one end of the lever and the controlling device and motion-transmitting link means connected between the other end of the lever and the shiftable control means.

References Cited in the file of this patent

UNITED STATES PATENTS

| | | |
|---|---|---|
| 2,217,364 | Halford et al. | Oct. 8, 1940 |
| 2,444,364 | Panish | June 29, 1948 |
| 2,480,758 | Mock | Aug. 30, 1949 |
| 2,487,239 | Hardy | Nov. 8, 1949 |
| 2,504,209 | Martin | Apr. 18, 1950 |
| 2,534,168 | Greenwood | Dec. 12, 1950 |
| 2,547,660 | Prince | Apr. 3, 1951 |
| 2,595,345 | Engelhardt et al. | May 6, 1952 |
| 2,635,699 | Richmond et al. | Apr. 21, 1953 |
| 2,646,847 | Haworth | July 28, 1953 |
| 2,667,935 | Woodward | Feb. 2, 1954 |

FOREIGN PATENTS

| | | |
|---|---|---|
| 625,176 | Great Britain | June 23, 1949 |
| 649,671 | Great Britain | Jan. 31, 1951 |

UNITED STATES PATENT OFFICE
CERTIFICATE OF CORRECTION

Patent No. 2,860,712

November 18, 1958

Charles J. McDowall et al.

It is hereby certified that error appears in the printed specification of the above numbered patent requiring correction and that the said Letters Patent should read as corrected below.

Column 1, line 60, for "pricipal" read -- principal --; column 2, lines 68 and 69, for "(now Patent No. 2,718,756." read -- (now Patent No. 2,718,756).-- column 4, line 28, for "safe" read -- safety --; column 17, line 69, for "450" read -- 540 --; column 19, line 17, for "but" read -- bus --; column 23, lines 47 and 48, for "regution" read -- regulation --.

Signed and sealed this 19th day of May 1959.

(SEAL)
Attest:

KARL H. AXLINE
Attesting Officer

ROBERT C. WATSON
Commissioner of Patents